(12) United States Patent
Tsukamoto

(10) Patent No.: US 7,388,611 B2
(45) Date of Patent: Jun. 17, 2008

(54) SOLID-STATE IMAGE-TAKING APPARATUS, SOLID-STATE IMAGE-TAKING SYSTEM, AND APPARATUS AND METHOD FOR DRIVING THE SOLID-STATE IMAGE-TAKING APPARATUS

(75) Inventor: Akira Tsukamoto, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 679 days.

(21) Appl. No.: 11/000,501

(22) Filed: Dec. 1, 2004

(65) Prior Publication Data

US 2005/0117041 A1 Jun. 2, 2005

(30) Foreign Application Priority Data

Dec. 2, 2003 (JP) ............... 2003-403484

(51) Int. Cl.
*H04N 3/14* (2006.01)
(52) U.S. Cl. ............... 348/294; 348/299; 348/308; 348/312; 348/314
(58) Field of Classification Search ............... 348/294, 348/241, 243, 311, 312, 314; 257/229, 230, 257/291, 208.01
See application file for complete search history.

(56) References Cited

U.S. PATENT DOCUMENTS 4,717,945 A * 1/1988 Yusa et al. .............. 257/229
6,760,073 B1 * 7/2004 Nakashiba ............... 348/314
6,933,976 B1 * 8/2005 Suzuki .................... 348/315
7,015,964 B1 * 3/2006 Koizumi et al. ......... 348/301
7,050,100 B2 * 5/2006 Sakurai et al. ........... 348/312
7,102,680 B2 * 9/2006 Mori et al. ............... 348/314

FOREIGN PATENT DOCUMENTS

JP 62-145865 6/1987

* cited by examiner

*Primary Examiner*—David Ometz
*Assistant Examiner*—Quang V Le
(74) *Attorney, Agent, or Firm*—McDermott Will & Emery LLP

(57) ABSTRACT

A solid-state image-taking system including a gate voltage control unit 31 and a substrate voltage control unit 32, for preventing generation of a defective image such as a residual image, without increasing the read voltage. The gate voltage control unit 31 applies the read voltage to the gate electrode 17 during the read period. The substrate voltage control unit 32 applies a stationary reverse bias voltage steadily to the semiconductor substrate 11 to cause electric charge excessively stored in the light-to-electric conversion unit 14 to overflow to a side of the semiconductor substrate 11, and not to the charge storage unit 13, and applies, during part or all of the read period, a specific reverse bias voltage that raises a potential barrier between the semiconductor substrate 11 and the well 12 to be higher than a height thereof when the stationary reverse bias voltage is applied.

4 Claims, 15 Drawing Sheets

US 7,388,611 B2

SOLID-STATE IMAGE-TAKING APPARATUS, SOLID-STATE IMAGE-TAKING SYSTEM, AND APPARATUS AND METHOD FOR DRIVING THE SOLID-STATE IMAGE-TAKING APPARATUS

BACKGROUND OF THE INVENTION (1) Field of the Invention

The present invention relates to a solid-state image-taking system that includes: a solid-state image-taking apparatus for outputting electric charge read from light-sensitive elements; and a driving apparatus for driving the solid-state image-taking apparatus, and more specifically relates to a technology for preventing generation of a defective image such as a residual image, without increasing the read voltage.

(2) Description of the Related Art

In recent years, image-taking apparatuses such as home video cameras and digital still cameras have been in widespread use.

Among such image-taking apparatuses, there are ones that use solid-state image-taking devices of charge-transfer types that read electric charge from light sensitive elements and transfer and output the read electric charge.

FIG. 17 shows the structure of a portion of a conventional solid-state image-taking device of charge-transfer type, the portion corresponding to one unit pixel.

As shown in FIG. 17, in the solid-state image-taking device, a p-well 72 is formed on an n-type substrate 71. The p-well 72 includes an n-type area 73 being an embedded channel, and an n-type area 74 being a photodiode. A p-type area 75 is provided between the n-type area 73 and the n-type area 74. A SiO$_2$ film 76 is formed on the p-well 72. A gate electrode 77 made of polysilicon is formed above the n-type area 73 with the SiO$_2$ film 76 in between. This structure of the conventional solid-state image-taking device of charge-transfer type is called MOS (metal-oxide semiconductor) structure.

The gate electrode 77 functions as a transfer electrode to transfer electric charge, and also functions as a read electrode to read electric charge from the photodiode.

Adjacent unit pixels are each separated by a p-type area 78 specifically provided for this purpose.

The p-well 72 is typically grounded. A reverse bias voltage is applied to the n-type substrate 71 for the p-well 72.

Here, varying the reverse bias voltage applied to the n-type substrate can change the potential depth of the photodiode, and can change the height of the potential barrier between the n-type substrate 71 and the photodiode. It should be noted here that what is called vertical overflow drain structure can be formed by setting the reverse bias voltage to such a value that allows electric charge excessively stored in the photodiode overflows to the side of the n-type substrate 71, not overflowing to the charge transfer channel. In the present document, overflowing of the electric charge excessively stored in the photodiode over to the charge transfer channel is referred to as "blooming". Also, a voltage that is applied to the substrate and is at the limit of inhibiting the blooming is referred to as a "blooming inhibit voltage". To prevent the blooming from occurring in the conventional solid-state image-taking device of charge-transfer type, it is necessary to form a potential barrier high enough to prevent the blooming, between the photodiode (n-type area 74) and the charge transfer channel (n-type area 73). It is therefore necessary to make the p-type impurity in the p-type area 75, which is provided for the potential control, dense enough to prevent the blooming, preventing the empty space between the photodiode and the charge transfer channel from broadening.

However, if the p-type impurity in the p-type area 75 is made dense enough to prevent the blooming and to prevent the empty space between the photodiode and the charge transfer channel from broadening, it becomes difficult for the empty space to broaden even if a positive voltage is applied to the gate electrode 77. When this happens, the read voltage must be set to a higher level to prevent signal charge from remaining.

Japanese Laid-Open Patent Application No. S62-145865 discloses a solid-state image-taking apparatus for preventing signal charge from remaining when the signal charge is transferred from the light-sensitive unit to the transfer unit, thus reducing an amount of residual image.

A defective image such as a residual image is generated when, for example, the signal charge remains because of the read voltage set to a low level.

On the other hand, there is a demand for decreasing the surface area of the unit pixel. However, if the surface area of the unit pixel is decreased, the horizontal width of the p-type area for the potential control is also decreased. This makes it necessary to increase the vertical depth of the p-type area. This also increases the read voltage. However, there is a limit to increasing the read voltage. As a result, sometimes the signal charge remains, and a defective image such as a residual image is generated.

SUMMARY OF THE INVENTION

The object of the present invention is therefore to provide a solid-state image-taking apparatus for preventing signal charge from remaining even if the read voltage is set to a low level, and for making it difficult for the signal charge to remain even if the surface area of the unit pixel is decreased, and to provide a solid-state image-taking system and an apparatus and a method for driving the solid-state image-taking apparatus.

The above object is fulfilled by a solid-state image-taking system comprising a solid-state image-taking apparatus for outputting electric charge read from a light-to-electric conversion unit, and a driving apparatus for driving the solid-state image-taking apparatus, the solid-state image-taking apparatus including: a semiconductor substrate of a first type which is either an n-type or a p-type; a well of a second type formed on the semiconductor substrate, the second type being either the n-type or the p-type and different from the first type; the light-to-electric conversion unit which, being the first type and formed in the well, is operable to generate and store electric charge that depends, in amount, on an amount of received light; a charge storage unit which, being the first type and formed in the well, is operable to store electric charge temporarily; and a gate unit which, being the second type and formed between the light-to-electric conversion unit and the charge storage unit in the well, is operable to move the electric charge from the light-to-electric conversion unit to the charge storage unit when a read voltage is applied to a gate electrode, the driving apparatus including: a read voltage control unit operable to not apply the read voltage to the gate electrode during a storage period in which the light-to-electric conversion unit generates and stores the electric charge that depends, in amount, on the amount of the received light, then to apply the read voltage to the gate electrode during a read period; and a reverse bias voltage control unit operable to apply a stationary reverse bias voltage steadily to the semiconductor substrate to cause electric charge excessively stored in the light-to-electric conversion unit to overflow to a side of the semiconductor substrate, and not to the charge storage unit, and operable to apply, during part or all of the read period, a specific reverse bias voltage that raises a potential barrier between the semiconductor substrate and the well to be higher than a height thereof when the reverse bias voltage control unit applies the stationary reverse bias voltage.

The above object is also fulfilled by a driving apparatus for driving a solid-state image-taking apparatus that outputs electric charge read from a light-to-electric conversion unit, the solid-state image-taking apparatus including: a semiconductor substrate of a first type which is either an n-type or a p-type; a well of a second type formed on the semiconductor substrate, the second type being either the n-type or the p-type and different from the first type; the light-to-electric conversion unit which, being the first type and formed in the well, is operable to generate and store electric charge that depends, in amount, on an amount of received light; a charge storage unit which, being the first type and formed in the well, is operable to store electric charge temporarily; and a gate unit which, being the second type and formed between the light-to-electric conversion unit and the charge storage unit in the well, is operable to move the electric charge from the light-to-electric conversion unit to the charge storage unit when a read voltage is applied to a gate electrode, the driving apparatus comprising: a read voltage control unit operable to not apply the read voltage to the gate electrode during a storage period in which the light-to-electric conversion unit generates and stores the electric charge that depends, in amount, on the amount of the received light, then to apply the read voltage to the gate electrode during a read period; and a reverse bias voltage control unit operable to apply a stationary reverse bias voltage steadily to the semiconductor substrate to cause electric charge excessively stored in the light-to-electric conversion unit to overflow to a side of the semiconductor substrate, and not to the charge storage unit, and operable to apply, during part or all of the read period, a specific reverse bias voltage that raises a potential barrier between the semiconductor substrate and the well to be higher than a height thereof when the reverse bias voltage control unit applies the stationary reverse bias voltage.

The above object is also fulfilled by a driving method for driving a solid-state image-taking apparatus that outputs electric charge read from a light-to-electric conversion unit, the solid-state image-taking apparatus including: a semiconductor substrate of a first type which is either an n-type or a p-type; a well of a second type formed on the semiconductor substrate, the second type being either the n-type or the p-type and different from the first type; the light-to-electric conversion unit which, being the first type and formed in the well, is operable to generate and store electric charge that depends, in amount, on an amount of received light; a charge storage unit which, being the first type and formed in the well, is operable to store electric charge temporarily; and a gate unit which, being the second type and formed between the light-to-electric conversion unit and the charge storage unit in the well, is operable to move the electric charge from the light-to-electric conversion unit to the charge storage unit when a read voltage is applied to a gate electrode, the driving method comprising the steps of: controlling storage by not applying the read voltage to the gate electrode and applying a stationary reverse bias voltage steadily to the semiconductor substrate to cause electric charge excessively stored in the light-to-electric conversion unit to overflow to a side of the semiconductor substrate, and not to the charge storage unit, while causing the light-to-electric conversion unit to generate and store electric charge that depends, in amount, on an amount of received light; and causing the electric charge to be read from the light-to-electric conversion unit to the charge storage unit by applying the read voltage to the gate electrode when, in the storage control step, the light-to-electric conversion unit has generated and stored the electric charge for a predetermined duration of time, and by applying, during part or all of a period in which the read voltage is applied, a specific reverse bias voltage that raises a potential barrier between the semiconductor substrate and the well to be higher than a height thereof when the stationary reverse bias voltage is applied.

With the above-stated construction, it is possible to form the vertical overflow drain structure, and at the same time raise the potential barrier between the semiconductor substrate and the well, during the read period.

This makes it possible to prevent signal charge from remaining even if the read voltage is set to a low level, and makes it difficult for the signal charge to remain even if the surface area of the unit pixel is decreased, contributing to the improvement of image quality and cost down.

The above-described driving apparatus may further comprise an output unit operable to output the electric charge, either directly or via transfer, from the charge storage unit to outside, wherein during a period immediately after the read voltage control unit completes applying the read voltage until the output unit completes outputting the electric charge, the reverse bias voltage control unit does not apply the specific reverse bias voltage that raises the potential barrier between the semiconductor substrate and the well to be higher than the height thereof when the reverse bias voltage control unit applies the stationary reverse bias voltage.

With the above-stated construction, the potential barrier between the semiconductor substrate and the well is not raised during a period immediately after the read voltage control unit completes applying the read voltage until the output unit completes outputting the electric charge. This enables the vertical overflow drain structure to be maintained and prevents the electric charge excessively stored in the light-to-electric conversion unit from overflowing to the charge storage unit.

This, accordingly, enables the signal charge to be output to outside in a proper manner.

In the above-described driving apparatus, the specific reverse bias voltage may be at a voltage level that causes no electric charge to remain in the light-to-electric conversion unit when the gate unit moves the electric charge from the light-to-electric conversion unit to the charge storage unit, the solid-state image-taking apparatus further including: a stationary reverse bias voltage generating circuit operable to generate the stationary reverse bias voltage in accordance with a stationary reverse bias voltage application instruction received from outside; and a specific reverse bias voltage generating circuit operable to generate the specific reverse bias voltage in accordance with a specific reverse bias voltage application instruction received from outside, wherein the reverse bias voltage control unit issues the stationary reverse bias voltage application instruction to the stationary reverse bias voltage generating circuit when the reverse bias voltage control unit applies the stationary reverse bias voltage, and issues the specific reverse bias voltage application instruction to the specific reverse bias voltage generating circuit when the specific bias voltage control unit applies the specific reverse bias voltage.

With the above-stated construction, it is possible to apply the stationary reverse bias voltage only by issuing the stationary reverse bias voltage application instruction. And similarly, it is possible to apply the specific reverse bias voltage only by issuing the specific reverse bias voltage application instruction.

This takes some load off the driving apparatus.

The above object is also fulfilled by a solid-state image-taking apparatus for outputting electric charge read from a light-to-electric conversion unit, comprising: a semiconductor substrate of a first type which is either an n-type or a p-type; a well of a second type formed on the semiconductor substrate, the second type being either the n-type or the p-type and different from the first type; the light-to-electric conversion unit which, being the first type and formed in the well, is operable to generate and store electric charge that depends, in amount, on an amount of received light; a charge storage unit which, being the first type and formed in the well, is operable to store electric charge temporarily; a gate unit which, being the second type and formed between the light-to-electric conversion unit and the charge storage unit in the well, is operable to move the electric charge from the light-to-electric conversion unit to the charge storage unit when a read voltage is applied to a gate electrode, a stationary reverse bias voltage generating circuit operable to generate a stationary reverse bias voltage in accordance with a stationary reverse bias voltage application instruction received from outside, the stationary reverse bias voltage, when applied to the semiconductor substrate, causing electric charge excessively stored in the light-to-electric conversion unit to overflow to a side of the semiconductor substrate, and not to the charge storage unit; and a specific reverse bias voltage generating circuit operable to generate a specific reverse bias voltage in accordance with a specific reverse bias voltage application instruction received from outside, the specific reverse bias voltage raising a potential barrier between the semiconductor substrate and the well to be higher than a height thereof when the stationary reverse bias voltage is applied.

With the above-stated construction, the stationary reverse bias voltage is applied if the stationary reverse bias voltage application instruction is received. And similarly, the specific reverse bias voltage is applied if the specific reverse bias voltage application instruction is received This takes some load off the driving apparatus, and increases the versatility.

In the above-described solid-state image-taking apparatus, the specific reverse bias voltage may be at a voltage level that causes no electric charge to remain in the light-to-electric conversion unit when the gate unit moves the electric charge from the light-to-electric conversion unit to the charge storage unit, the solid-state image-taking apparatus further comprising a specific reverse bias voltage setting unit operable to set a voltage level of the specific reverse bias voltage output from the specific reverse bias voltage generating circuit, in accordance with a voltage level set instruction received from outside.

With the above-stated construction, it is possible to set, from outside, the voltage level of the specific reverse bias voltage. This enables every device to have the same characteristics.

This accordingly takes further load off the driving apparatus.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Embodiment 1

Outline

In Embodiment 1 of the present invention, the reverse bias voltage is changed while the read voltage is applied so that signal charge does not remain even if the read voltage has been set to a low level. This is based on the fact that in a solid-state image-taking device that forms the vertical overflow drain structure, there is no need to form the vertical overflow drain structure when the electric charge is read from light-sensitive elements, and the fact that changing the reverse bias voltage forming the vertical overflow drain structure causes the height of the potential barrier between the n-type substrate and the photodiode to change, causing the potential depth of the photodiode to change.

Construction

Figure 1:
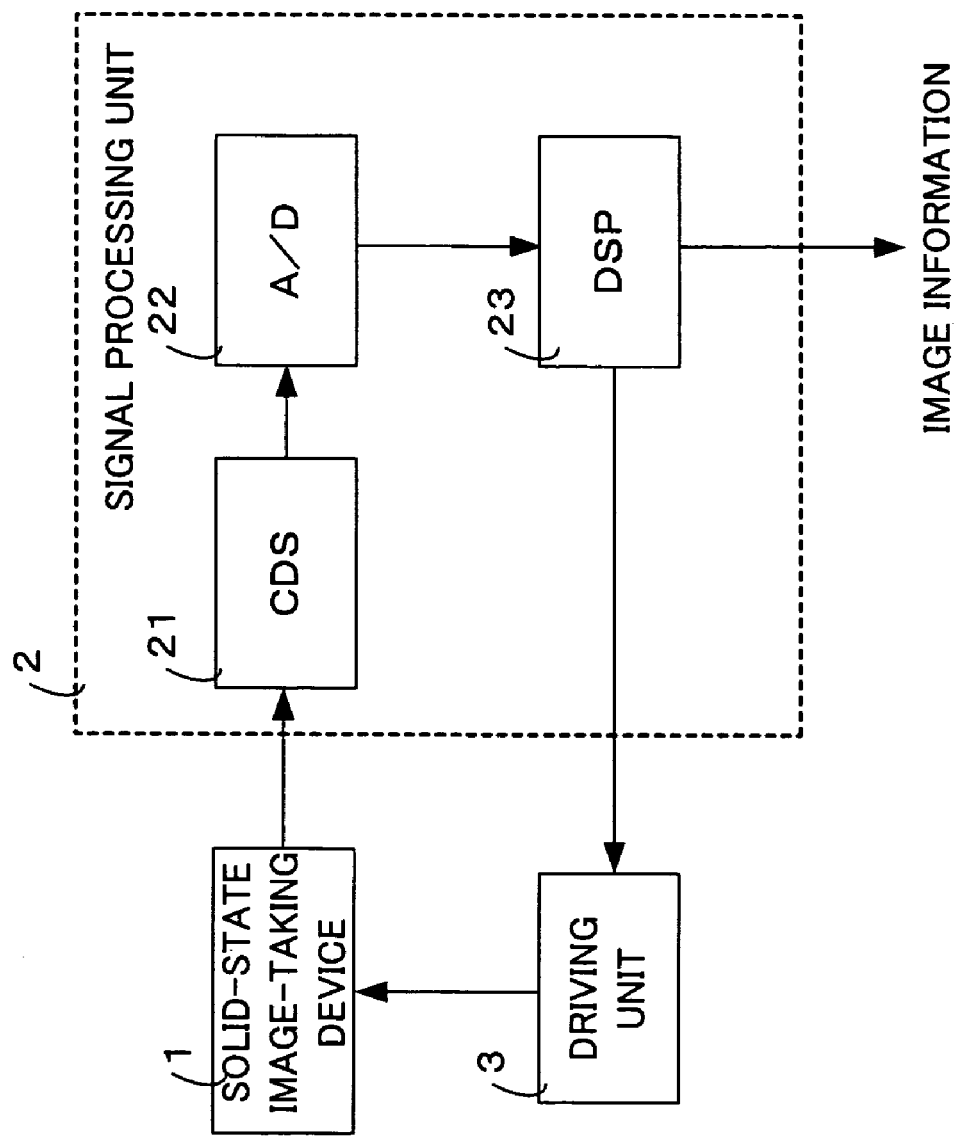
FIG. 1 shows the construction of an image-taking system in Embodiment 1 of the present invention.

FIG. 1 shows the construction of an image-taking system in Embodiment 1 of the present invention.

As shown in FIG. 1, the image-taking system in Embodiment 1 is embedded in an image-taking apparatus such as a video camera or a digital still camera. The image-taking system generates image information by performing a light-to-electric conversion onto an image that was formed through a lens, and outputs the generated image information. The image-taking system includes a solid-state image-taking device 1, a signal processing unit 2, and a driving unit 3.

The solid-state image-taking device 1, driven by the driving unit 3, allows the light it receives to pass through a lens (not illustrated) to be focused as an image, which is then projected on a plurality of two-dimensionally arranged light-sensitive elements, and a plurality of vertical CCDs (charge-coupled devices) and a horizontal CCD collaborate to output luminance signals, which are generated as a result of the light-to-electric conversion performed by the light-sensitive elements, to the signal processing unit 2 in a predetermined order.

The signal processing unit 2 outputs a drive instruction to the driving unit 3. The signal processing unit 2 processes the luminance-signal output from the solid-state image-taking device 1, and outputs the processing results to outside. The signal processing unit 2 includes a CDS (analog signal processing unit) 21, an A/D (analog-to-digital conversion unit) 22, and a DSP (digital signal processor) 23.

The CDS 21 eliminates noise from the luminance signal output from the solid-state image-taking device 1, and then amplifies the luminance signal.

The A/D 22 converts the analog luminance signal, from which noise has been eliminated by the CDS 21, into a digital luminance signal through the A/D conversion.

The DSP 23 generates image information by performing a digital process onto the digital luminance signal output from the A/D 22.

The driving unit 3 drives the solid-state image-taking device 1 in accordance with the drive instruction from the signal processing unit 2.

Figure 2:
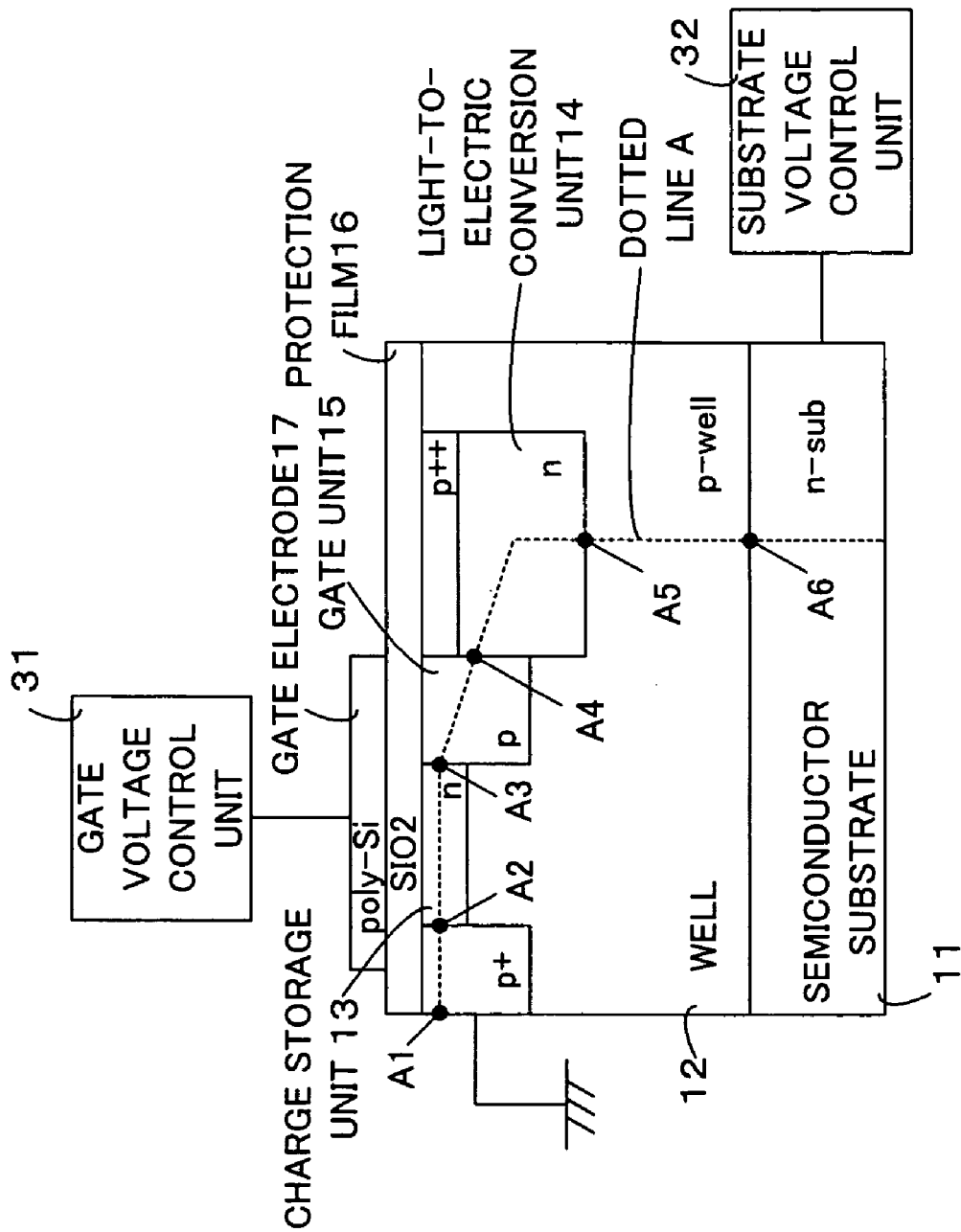
FIG. 2 is a cross-sectional view of a portion of the solid-state image-taking device 1 that corresponds to one unit pixel, and the gate voltage control unit 31 and the substrate voltage control unit 32 provided in the driving unit 3.

FIG. 2 is a cross-sectional view of a portion of the solid-state image-taking device 1 that corresponds to one unit pixel. FIG. 2 also shows a gate voltage control unit 31 and a substrate voltage control unit 32.

As shown in FIG. 2, the portion of the solid-state image-taking device 1 includes a semiconductor substrate 11, a well 12, a charge storage unit 13, a light-to-electric conversion unit 14, a gate unit 15, a protection film 16, and a gate electrode 17.

The semiconductor substrate 11 is n-type or p-type. In the present embodiment, it is presumed that the semiconductor substrate 11 is n-type.

The well 12 is formed on the semiconductor substrate 11, and is of a type different from the type of the semiconductor substrate 11. In the present embodiment, it is presumed that the well 12 is p-type.

The charge storage unit 13 is an area having the same type as the semiconductor substrate 11, and is formed in the well 12. The charge storage unit 13 is an embedded channel that temporarily stores electric charge.

The light-to-electric conversion unit 14 is a photodiode formed in the well 12. The light-to-electric conversion unit 14 generates and stores electric charge that depends, in amount, on the amount of the received light.

The gate unit 15 is an area formed between the light-to-electric conversion unit 14 and the charge storage unit 13 in the well 12, and is different from the semiconductor substrate 11 in type. The gate unit 15 moves the electric charges from the light-to-electric conversion unit 14 to the charge storage unit 13 when the read voltage is applied to the gate electrode 17.

The protection film 16 is a protection film for protecting the areas formed on the semiconductor substrate 11. In the present embodiment, it is presumed that the protection film 16 is $SiO_2$ film.

The gate electrode 17 has the function of a transfer electrode used for transfer electric charge, and the function of a read electrode used for reading electric charge from the photodiode. In the present embodiment, it is presumed that the gate electrode 17 is made of polysilicon (poly-Si).

The gate voltage control unit 31 does not apply the read voltage to the gate electrode 17 during a storage period in which the light-to-electric conversion unit 14 generates and stores electric charge that depends, in amount, on the amount of the received light, then applies the read voltage to the gate electrode 17 during a read period in which the stored electric charge is read into the charge storage unit 13, and then applies a transfer pulse to the gate electrode 17 during a transfer period in which the read electric charge is transferred and output to outside. It should be noted here that while a moving picture is taken, part or all of the transfer period of an image constituting the moving picture overlaps with the storage period of the next image.

The substrate voltage control unit 32 forms a vertical overflow drain structure in the solid-state image-taking apparatus by steadily applying, to the semiconductor substrate 11, a stationary reverse bias voltage that causes the electric charge excessively stored in the n-type area of the light-to-electric conversion unit 14 to overflow to the side of the semiconductor substrate 11, and not to the charge storage unit 13. The substrate voltage control unit 32 applies, during part or all of the read period, a first specific reverse bias voltage that raises a potential barrier between the semiconductor substrate 11 and the well 12 to be higher than the height thereof when the substrate voltage control unit 32 applies the stationary reverse bias voltage. This application of the first specific reverse bias voltage prevents signal charge from remaining. Also, the substrate voltage control unit 32 applies, with a given timing during the charge storage period, a second specific reverse bias voltage that lowers the potential barrier to be lower than the potential of the light-to-electric conversion unit 14. This enables the electric charge stored in the n-type area of the light-to-electric conversion unit 14 to be discarded to the side of the semiconductor substrate 11. This achieves a vertical electronic shutter that controls the charge storage time that is an amount of time required to read the electric charge.

Figure 3:
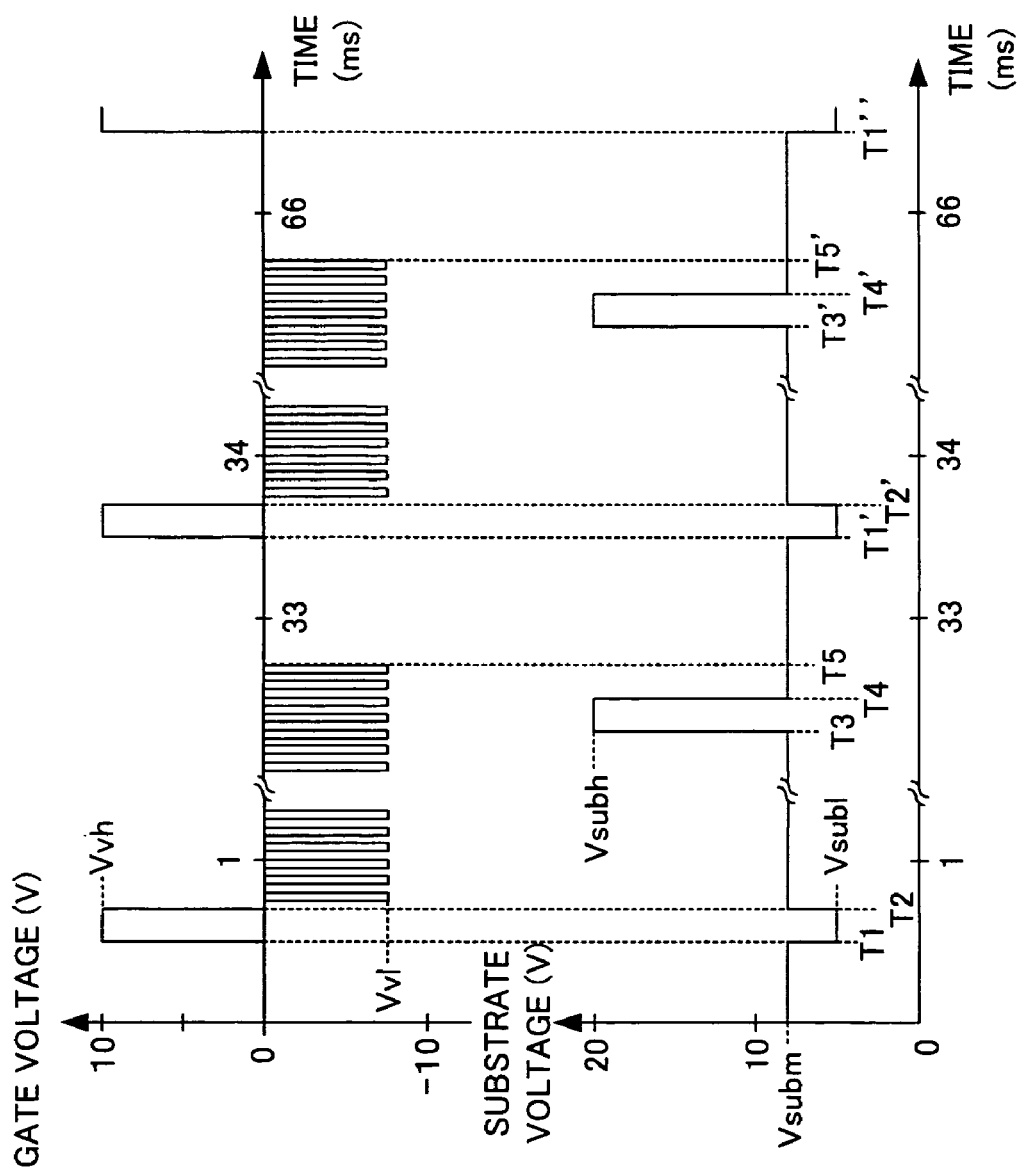
FIG. 3 shows specific examples of the gate voltage applied to the gate electrode 17 by the gate voltage control unit 31, and the reverse bias voltage applied to the semiconductor substrate 11 by the substrate voltage control unit 32.

FIG. 3 shows specific examples of the gate voltage applied to the gate electrode 17 by the gate voltage control unit 31, and the reverse bias voltage applied to the semiconductor substrate 11 by the substrate voltage control unit 32.

As shown in FIG. 3, during the read period (the period between time T1 and T2 and the period between time T1' and T2'), 10V of the read voltage Vvh having 200 μs of pulse width is applied to the gate electrode 17. During the transfer period (the period between time T2 and T5 and the period between time T2' and T5'), −7.5V of the transfer voltage Vvl having 50 μs of pulse width is applied to the gate electrode 17 at intervals of 50 µs for the duration of, for example, 320 µs that corresponds to the number of transfers. During the read period, approximately 5V of the first specific reverse bias voltage Vsubl is applied to the semiconductor substrate 11. During the discard period (the period between time T3 and T4 and the period between time T3' and T4'), approximately 20V of the second specific reverse bias voltage Vsubh is applied to the semiconductor substrate 11. During the drain period (the period between time T2 and T3, the period between time T4 and T1', the period between time T2' and T3', and the period between time T4'and T1''), approximately 8V of the stationary reverse bias voltage Vsubm is applied to the semiconductor substrate 11.

Figure 4:
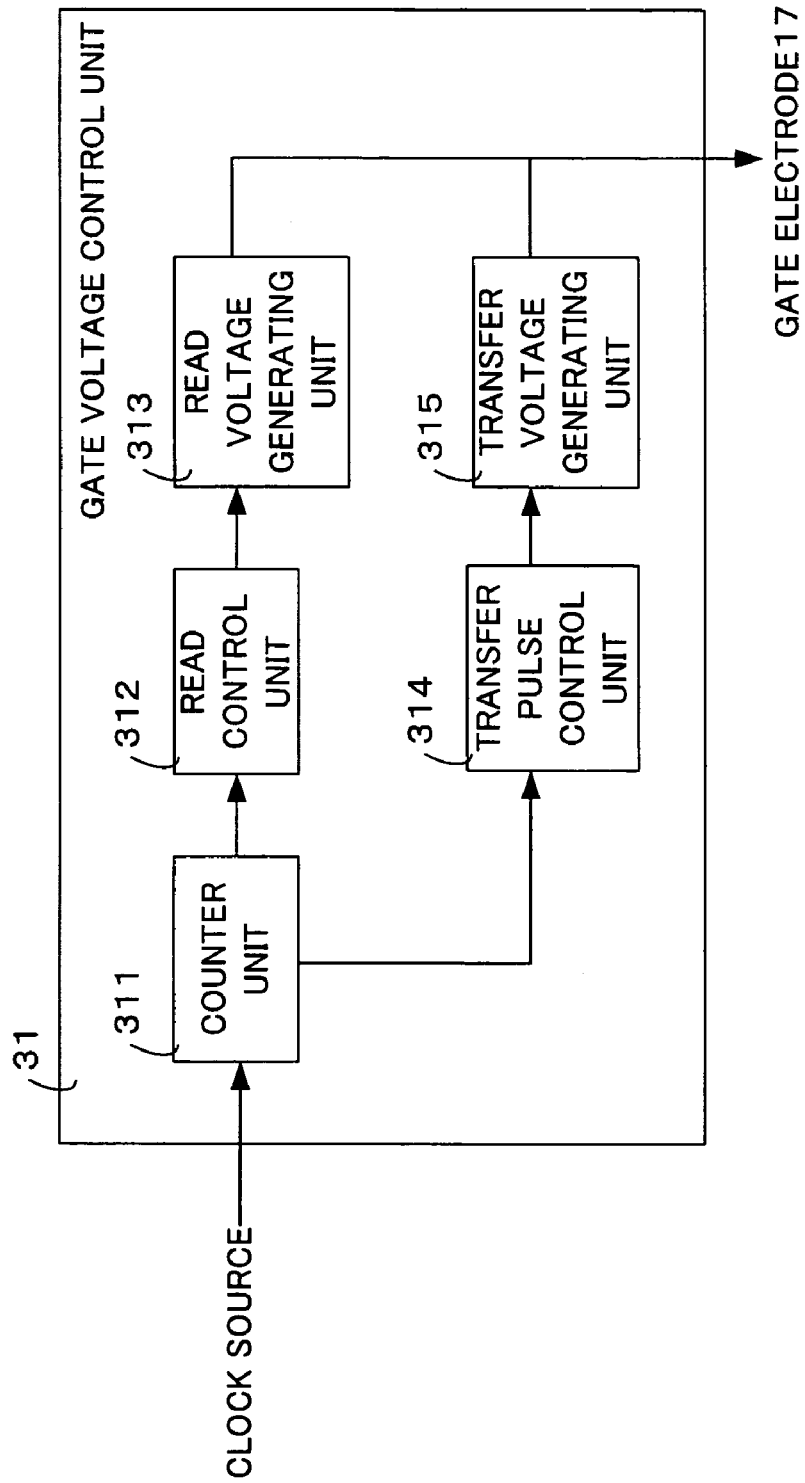
FIG. 4 shows a specific example of the gate voltage control unit 31.

FIG. 4 shows a specific example of the gate voltage control unit 31.

As shown in FIG. 4, the gate voltage control unit 31 includes a counter unit 311, a read control unit 312, a read voltage generating unit 313, a transfer pulse control unit 314, and a transfer voltage generating unit 315.

The counter unit 311 is a scale-of-660 counter for obtaining counts of a 50 KHz clock source and outputting 660 counts thereof with each cycle. The counter unit 311 outputs counts "0" and "4" to the read control unit 312, and outputs count "5" to the transfer pulse control unit 314.

The read control unit 312 is, for example, a SR latch, and starts outputting a control signal, which instructs to output the read voltage, to the read voltage generating unit 313 when it receives count "0", and stops outputting the control signal when it receives count "4".

The read voltage generating unit 313 is, for example, a booster circuit, and raises a voltage input from a direct-current power source to a level of the read voltage and outputs the read voltage while it receives a control signal from the read control unit 312.

The transfer pulse control unit 314 is a pulse generating circuit, and outputs a pulse of a control signal, which instructs to output the transfer voltage, to the transfer voltage generating unit 315 a predetermined number of times, starting to output the pulse when it receives count "5" from the counter unit 311.

The transfer voltage generating unit 315 is, for example, a booster circuit, and raises a voltage input from a direct-current power source to a level of the transfer voltage and outputs the transfer voltage while it receives a control signal from the transfer pulse control unit 314.

Figure 5:
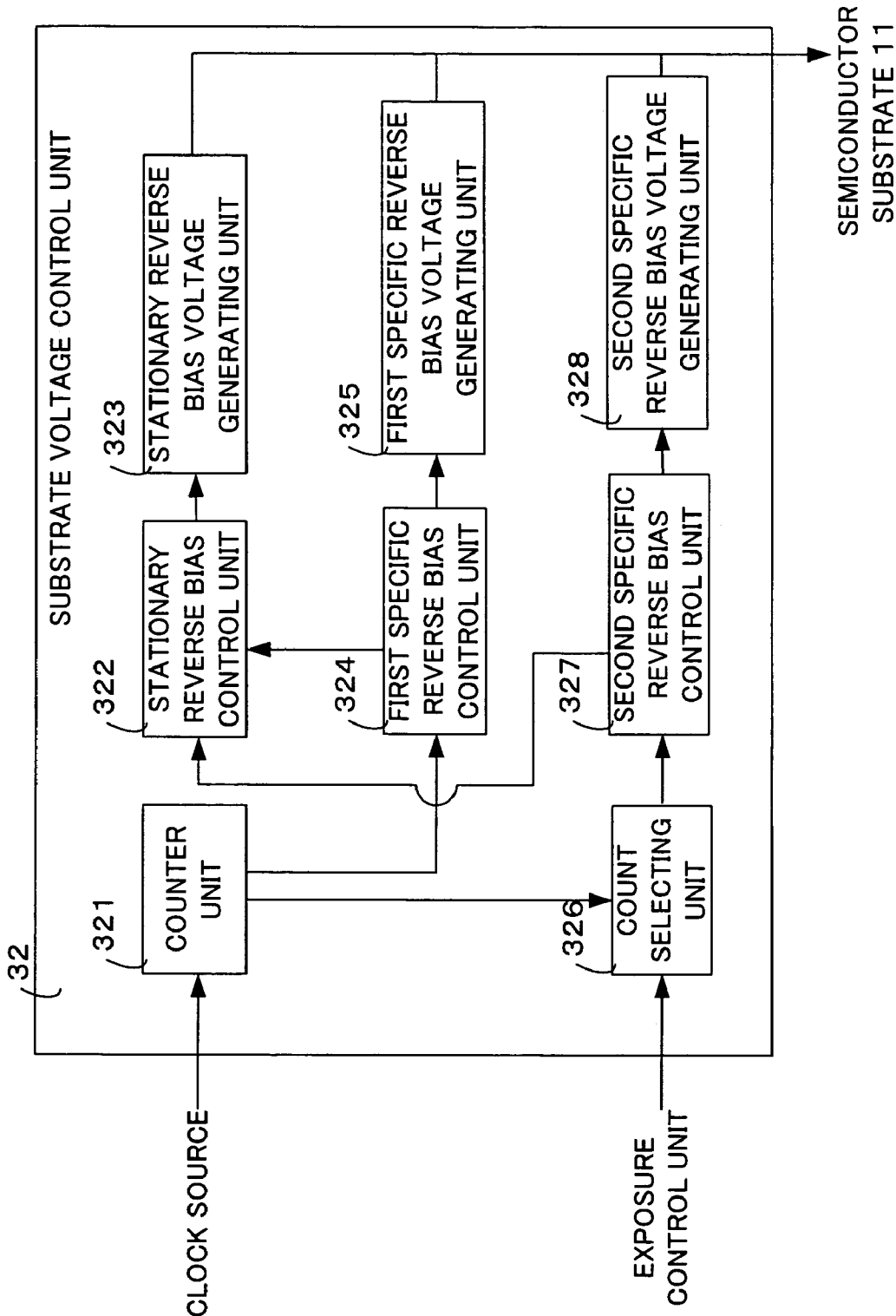
FIG. 5 shows a specific example of the substrate voltage control unit 32.

FIG. 5 shows a specific example of the substrate voltage control unit 32.

As shown in FIG. 5, the substrate voltage control unit 32 includes a counter unit 321, a stationary reverse bias control unit 322, a stationary reverse bias voltage generating unit 323, a first specific reverse bias control unit 324, a first specific reverse bias voltage generating unit 325, a count selecting unit 326, a second specific reverse bias control unit 327, and a second specific reverse bias voltage generating unit 328.

The counter unit 321, as is the case with the counter unit 311, is a scale-of-660 counter for obtaining counts of, for example, a 50 KHz clock source and outputting 660 counts thereof with each cycle. The counter unit 321 synchronizes with the counter unit 311, and outputs counts "0" and "4" to the first specific reverse bias control unit 324, and outputs counts "5"-"650" to the count selecting unit 326.

The stationary reverse bias control unit 322 is, for example, a logic circuit, and steadily outputs a control signal, which instructs to output a stationary reverse bias voltage, to the stationary reverse bias voltage generating unit 323 except for a period during which it receives a control signal from the first specific reverse bias control unit 324 or the second specific reverse bias control unit 327.

The stationary reverse bias voltage generating unit 323 is, for example, a booster circuit, and raises a voltage input from a direct-current power source to a level of the stationary reverse bias voltage and outputs the stationary reverse bias voltage while it receives a control signal from the stationary reverse bias control unit 322.

The first specific reverse bias control unit 324 is, for example, a SR latch, and starts outputting a control signal, which instructs to output the first specific reverse bias voltage, to the stationary reverse bias control unit 322 and the first specific reverse bias voltage generating unit 325 when it receives count "0", and stops outputting the control signal when it receives count "4".

The first specific reverse bias voltage generating unit 325 is, for example, a booster circuit, and raises a voltage input from a direct-current power source to a level of the first specific reverse bias voltage and outputs the first specific reverse bias voltage while it receives a control signal from the first specific reverse bias control unit 324.

The count selecting unit 326 is, for example, a selector, selects two counts depending on a shutter speed specified by an exposure control unit or the like, and outputs the selected counts to the second specific reverse bias control unit 327. In this example, it is presumed that the shutter speed is set to 1/1,000s, and in correspondence with the setting, counts "646" and "650" are selected.

The second specific reverse bias control unit 327 is, for example, a SR latch, and starts outputting a control signal, which instructs to output the second specific reverse bias voltage, to the stationary reverse bias control unit 322 and the second specific reverse bias voltage generating unit 328 when it receives the first one of the selected two counts, and stops outputting the control signal when it receives the second one of the selected two counts.

The second specific reverse bias voltage generating unit 328 is, for example, a booster circuit, and raises a voltage input from a direct-current power source to a level of the second specific reverse bias voltage and outputs the second specific reverse bias voltage while it receives a control signal from the second specific reverse bias control unit 327.

Figure 6:
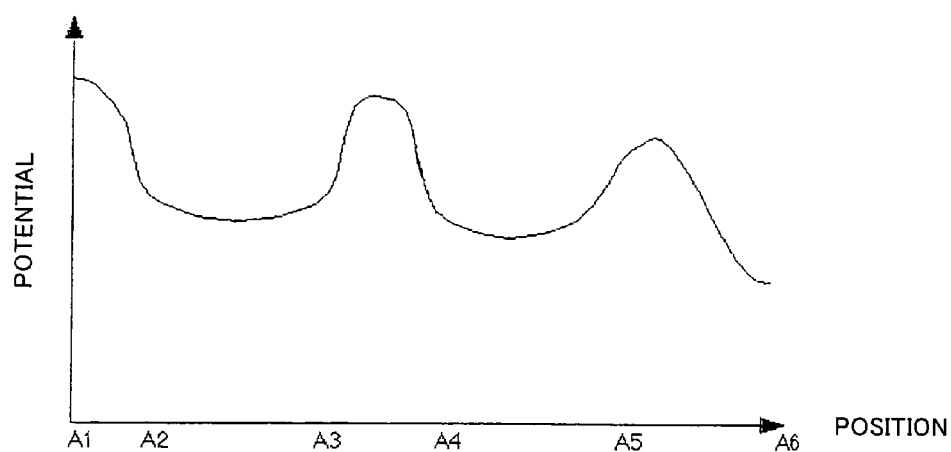
FIG. 6 shows a potential distribution measured along the dotted line A shown in FIG. 2 during the drain period shown in FIG. 3.

FIG. 6 shows a potential distribution measured along the dotted line A shown in FIG. 2 during the drain period shown in FIG. 3.

Figure 7:
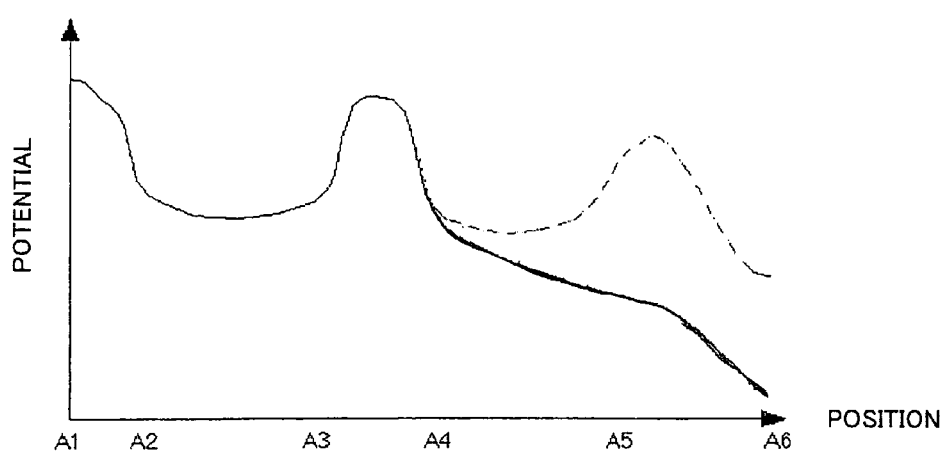
FIG. 7 shows a potential distribution measured along the dotted line A shown in FIG. 2 during the discard period shown in FIG. 3.

FIG. 7 shows a potential distribution measured along the dotted line A shown in FIG. 2 during the discard period shown in FIG. 3.

Figure 8:
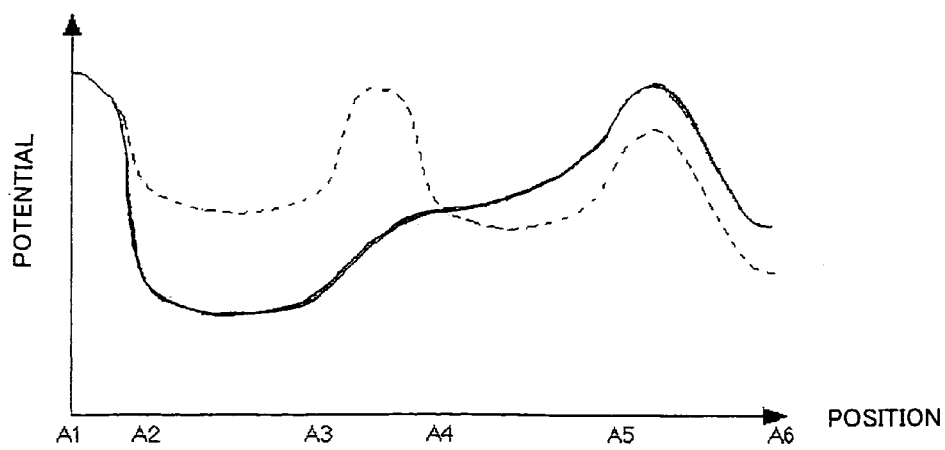
FIG. 8 shows a potential distribution measured along the dotted line A shown in FIG. 2 during the read period shown in FIG. 3.

FIG. 8 shows a potential distribution measured along the dotted line A shown in FIG. 2 during the read period shown in FIG. 3.

It should be noted here that the points A1-A6 shown in FIGS. 6-8 respectively correspond to the points A1-A6 on the dotted line shown in FIG. 2, and that the potential distribution line shown in FIG. 6 is also provided in FIGS. 7 and 8 as a dotted line for the sake of comparison.

As shown in FIG. 6, the potential barrier between A5 and A6 is lower than the potential barrier between A3 and A4 during the drain period. This causes the electric charge excessively stored in the n-type area of the light-to-electric conversion unit 14 to overflow to the side of the semiconductor substrate 11 and not to overflow to the charge storage unit 13 during the drain period. This indicates that the vertical overflow drain structure is formed.

As shown in FIG. 7, the potential barrier between A5 and A6 is lower than the potential between A4 and A5 during the discard period. This causes the electric charge excessively stored in the n-type area of the light-to-electric conversion unit 14 to be discarded to the side of the semiconductor substrate 11.

As shown in FIG. 8, during the read period, the potential between A2 and A4 is lowered as the read voltage is applied to the gate electrode 17, and at the same time, the potential between A4 and A6 is raised as the reverse bias voltage is lowered. This prevents the signal charges from remaining.

Operation

Figure 9:
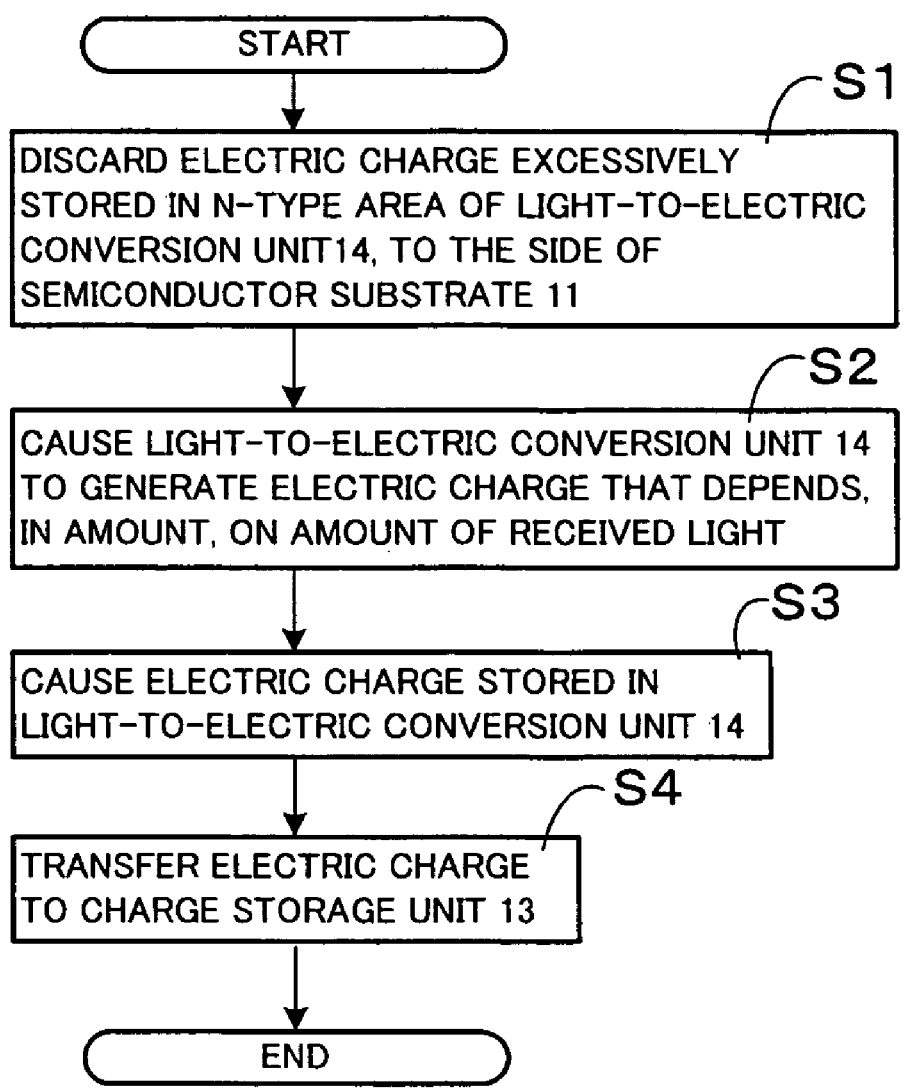
FIG. 9 shows a procedure for the image-taking system in Embodiment 1 to read electric charges for one image.

FIG. 9 shows a procedure for the image-taking system in Embodiment 1 to read electric charges for one image.

The following explains the procedure of reading electric charges for one screen using FIGS. 3, 6, 7, 8, and 9.

(1) During the discard period (the period between time T3 and time T4 shown in FIG. 3), the substrate voltage control unit 32 applies the second specific reverse bias voltage (of approximately 20V) to the semiconductor substrate 11 to allow the electric charge excessively stored in the n-type area of the light-to-electric conversion unit 14 to be discarded to the side of the semiconductor substrate 11 (step S1).

(2) During the drain period (the period between time T4 and T1' shown in FIG. 3), the substrate voltage control unit 32 applies the stationary reverse bias voltage (approximately 8V) to the semiconductor substrate 11, causing the light-to-electric conversion unit 14 to generate electric charge that depends, in amount, on the amount of the received light (step S2).

(3) During the read period (the period between time T1' and T2' shown in FIG. 3), the substrate voltage control unit 32 applies the first specific reverse bias voltage (approximately 5V) to the semiconductor substrate 11, and the gate voltage control unit 31 applies the read voltage (10V) to the gate electrode 17. This allows the electric charge stored in the light-to-electric conversion unit 14 to be read into the charge storage unit 13 (step S3).

(4) During the transfer period (the period between time T2' and T5' shown in FIG. 3), the substrate voltage control unit 32 applies the stationary reverse bias voltage (approximately 8V), and the gate voltage control unit 31 applies the transfer voltage (–7.5V) to the gate electrode 17 for a duration corresponding to the number of transfers. This allows the read electric charge to be transferred to the charge storage unit 13 (step S4).

Summary

According to Embodiment 1 having been described up to now, the reverse bias voltage is changed while the read voltage is applied, to decrease the potential depth of the photodiode. This makes it possible to prevent signal charge from remaining even if the read voltage is set to a low level. This also makes it difficult for the signal charge to remain, while maintaining the saturation amount of electric charge, even if the surface area of the unit pixel is decreased.

Embodiment 2

Outline

In Embodiment 2 of the present invention, as is the case with Embodiment 1, the reverse bias voltage is changed while the read voltage is applied so that signal charge does not remain even if the read voltage has been set to a low level. This is based on the fact that in a solid-state image-taking device that forms the vertical overflow drain structure, there is no need to form the vertical overflow drain structure when the electric charge is read from light-sensitive elements, and the fact that changing the reverse bias voltage forming the vertical overflow drain structure causes the height of the potential barrier between the n-type substrate and the photodiode to change, causing the potential depth of the photodiode to change. Embodiment 2 achieve this in a slightly different manner from Embodiment 1.

More specifically, in Embodiment 1, the voltages to be applied respectively to the gate and the substrate of the solid-state image-taking device 4 are generated by variable booster circuits in the driving unit and are supplied to the solid-state image-taking device. In contrast, in Embodiment 2, the driving unit only notifies the solid-state image-taking device of the timing with which each voltage is applied, and voltage generating circuits for actually generating each voltage are provided in the solid-state image-taking device. Also, the solid-state image-taking device in Embodiment 2 is provided with voltage setting circuits for, respectively, setting voltage values that require fine adjustment, such as the read voltage, stationary reverse bias voltage, and first specific reverse bias voltage. This makes it possible to set output voltage values of some voltage generating circuit by executing an initial setting procedure before the shipment or use.

Construction

Figure 10:
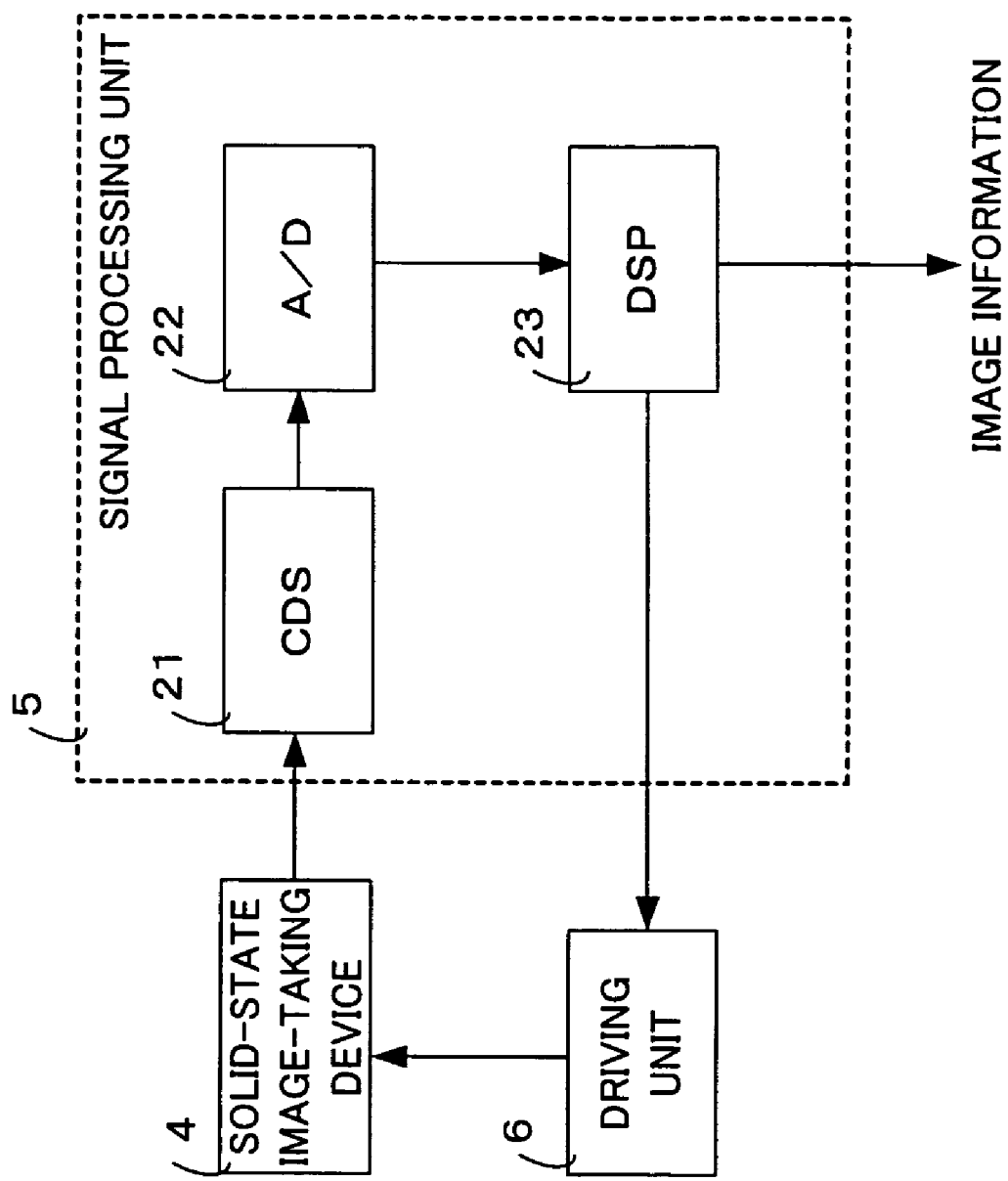
FIG. 10 shows the construction of an image-taking system in Embodiment 2 of the present invention.

FIG. 10 shows the construction of an image-taking system in Embodiment 2 of the present invention.

As shown in FIG. 10, as is the case with the image-taking system in Embodiment 1, the image-taking system in Embodiment 2 is embedded in an image-taking apparatus such as a video camera or a digital still camera. The image-taking system generates image information by performing a light-to-electric conversion onto an image that was formed through a lens, and outputs the generated image information. The image-taking system includes a solid-state image-taking device 4, a signal processing unit 5, and a driving unit 6.

The solid-state image-taking device 4, driven by the driving unit 6, allows the light it receives to pass through a lens (not illustrated) to be focused as an image, which is then projected on a plurality of two-dimensionally arranged light-sensitive elements, and a plurality of vertical CCDs (charge-coupled devices) and a horizontal CCD collaborate to output luminance signals, which are generated as a result of the light-to-electric conversion performed by the light-sensitive elements, to the signal processing unit 5 in a predetermined order.

The signal processing unit 5 outputs a drive instruction to the driving unit 6. The signal processing unit 5 processes the luminance signal output from the solid-state image-taking device 1, and outputs the processing results to outside. The signal processing unit 5 includes the CDS (analog signal processing unit) 21, the A/D (analog-to-digital conversion unit) 22, and the DSP (digital signal processor) 23.

The driving unit 6 drives the solid-state image-taking device 4 in accordance with the drive instruction from the signal processing unit 5.

Figure 11:
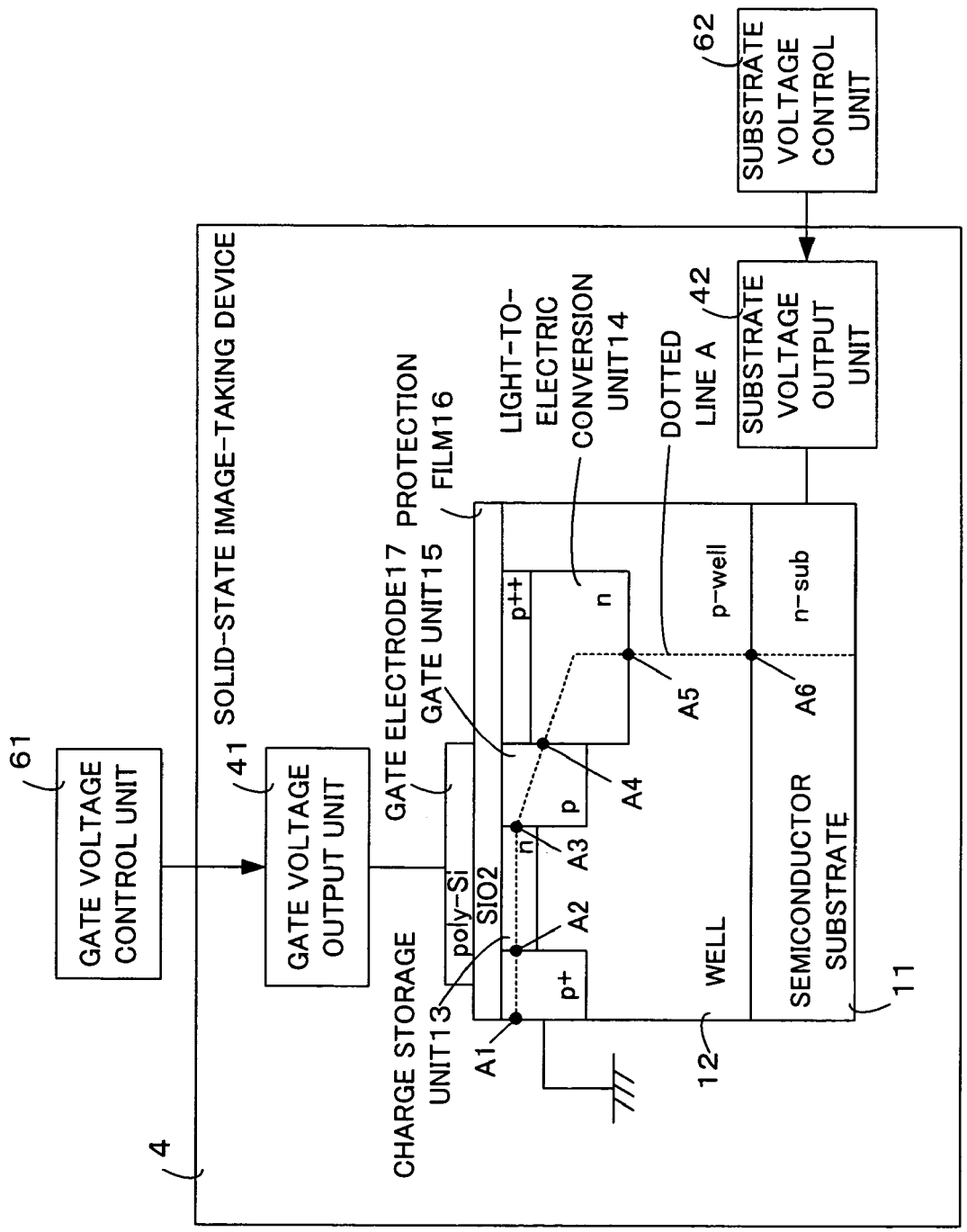
FIG. 11 is a cross-sectional view of a portion of the solid-state image-taking device 4 that corresponds to one unit pixel, a gate voltage output unit 41 and a substrate voltage output unit 42 included in the solid-state image-taking device 4, and a gate voltage control unit 61 and a substrate voltage control unit 62 included in the driving unit 6.

FIG. 11 is a cross-sectional view of a portion of the solid-state image-taking device 4 that corresponds to one unit pixel. FIG. 11 also shows a gate voltage output unit 41 and a substrate voltage output unit 42 included in the solid-state image-taking device 4, and a gate voltage control unit 61 and a substrate voltage control unit 62 included in the driving unit 6.

As shown in FIG. 11, as is the case with Embodiment 1, the portion of the solid-state image-taking device 4 includes the semiconductor substrate 11, the well 12, the charge storage unit 13, the light-to-electric conversion unit 14, the gate unit 15, the protection film 16, and the gate electrode 17.

The gate voltage output unit 41, under the control of the gate voltage control unit 61, raises a voltage input from a direct-current power source to levels of the read voltage and the transfer voltage, and outputs the read voltage and the transfer voltage.

The substrate voltage output unit 42, under the control of the substrate voltage control unit 62, raises a voltage input from a direct-current power source to levels of the stationary specific reverse bias voltage, the first specific reverse bias voltage, and the second specific reverse bias voltage, and outputs these voltages.

The gate voltage control unit 61 controls the gate voltage output unit 41 so that the gate voltage output unit 41 does not apply the read voltage to the gate electrode 17 during a storage period in which the light-to-electric conversion unit 14 generates and stores electric charge that depends, in amount, on the amount of the received light. The gate voltage control unit 61 also controls the gate voltage output unit 41 so that the gate voltage output unit 41 then applies the read voltage to the gate electrode 17 during a read period in which the stored electric charge is read into the charge storage unit 13. The gate voltage control unit 61 also controls the gate voltage output unit 41 so that the gate voltage output unit 41 then applies a transfer pulse to the gate electrode 17 during a transfer period in which the read electric charge is transferred and output to outside. It should be noted here that while a moving picture is taken, part or all of the transfer period of an image constituting the moving picture overlaps with the storage period of the next image.

The substrate voltage control unit 62 controls the substrate voltage output unit 42 so that the substrate voltage output unit 42 steadily applies a stationary reverse bias voltage to the semiconductor substrate 11. This allows the electric charge excessively stored in the n-type area of the light-to-electric conversion unit 14 to overflow to the side of the semiconductor substrate 11, not over to the charge storage unit 13. This forms a vertical overflow drain structure. The substrate voltage control unit 62 controls the substrate voltage output unit 42 so that the substrate voltage output unit 42 applies, during part or all of the read period, a first specific reverse bias voltage that raises a potential barrier between the semiconductor substrate 11 and the well 12 to be higher than the height thereof when the substrate voltage control unit 42 applies the stationary reverse bias voltage. This application of the first specific reverse bias voltage prevents signal charge from remaining. Also, the substrate voltage control unit 62 controls the substrate voltage output unit 42 so that the substrate voltage output unit 42 applies, with a given timing during the charge storage period, a second specific reverse bias voltage that lowers the potential barrier to be lower than the potential of the light-to-electric conversion unit 14. This enables the electric charge stored in the n-type area of the light-to-electric conversion unit 14 to be discarded to the side of the semiconductor substrate 11. This achieves a vertical electronic shutter that controls the charge storage time that is an amount of time required to read the electric charge.

Figure 12:
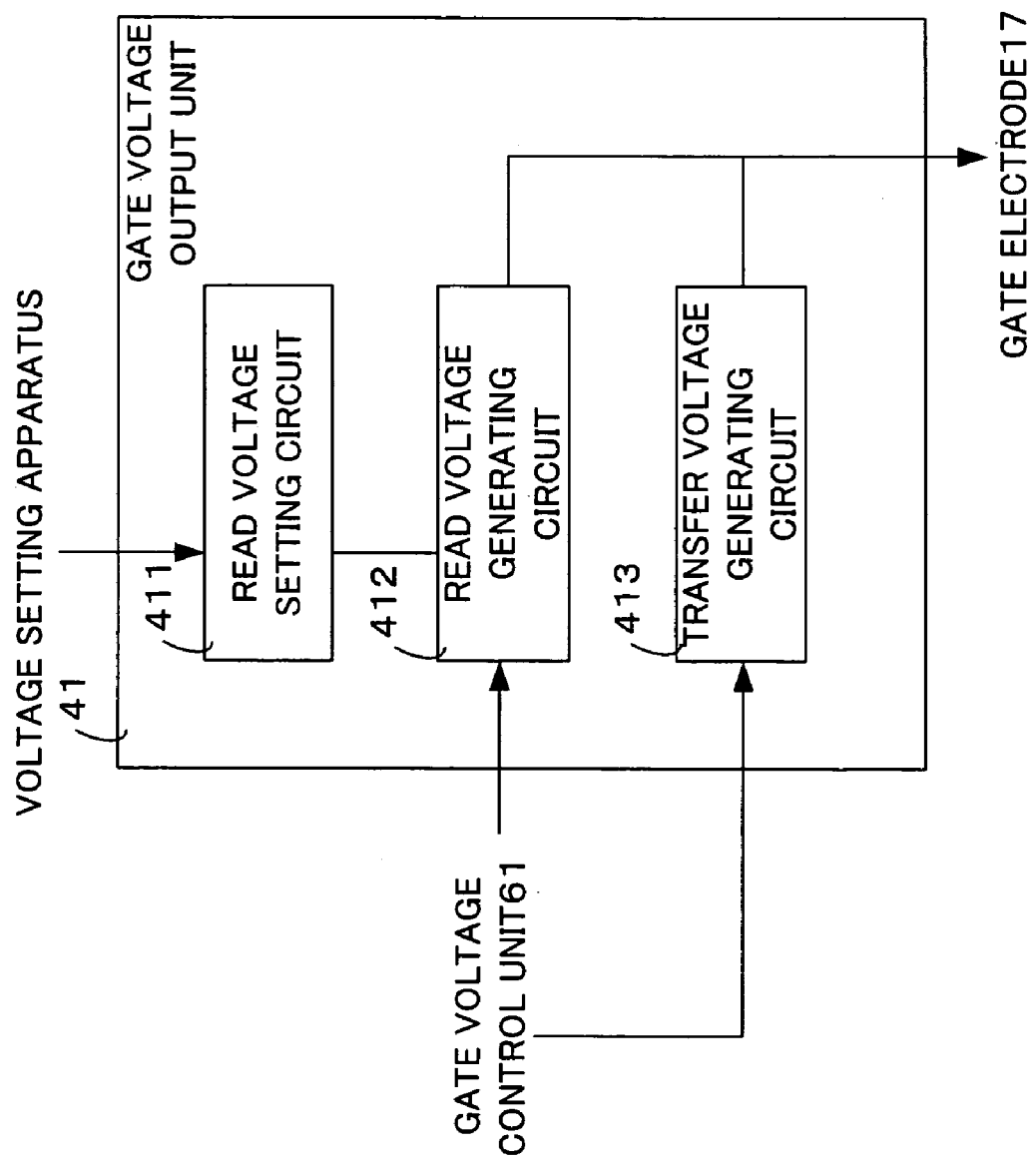
FIG. 12 shows a specific example of the gate voltage output unit 41.

FIG. 12 shows a specific example of the gate voltage output unit 41.

As shown in FIG. 12, the gate voltage output unit 41 includes a read voltage setting circuit 411, a read voltage generating circuit 412, and a transfer voltage generating circuit 413.

The read voltage setting circuit 411 is, for example, a resistance array with fuse. A circuit constant set in the read voltage setting circuit 411 can be changed by, for example, causing an external voltage setting apparatus to apply a high voltage to the read voltage setting circuit 411 to blow the fuse and change the value of resistance. With use of the read voltage setting circuit 411, it is possible, by adjusting the circuit constant from outside, to set the read voltage that is output from the read voltage generating circuit 412.

The read voltage generating circuit 412 is a variable booster circuit, and raises a voltage input from a power source to a level of the read voltage, based on the circuit constant of the read voltage setting circuit 411, and outputs the read voltage.

The transfer voltage generating circuit 413 is a fixed booster circuit, and raises a voltage input from a power source to a predetermined level of the transfer voltage, and outputs the transfer voltage.

Figure 13:
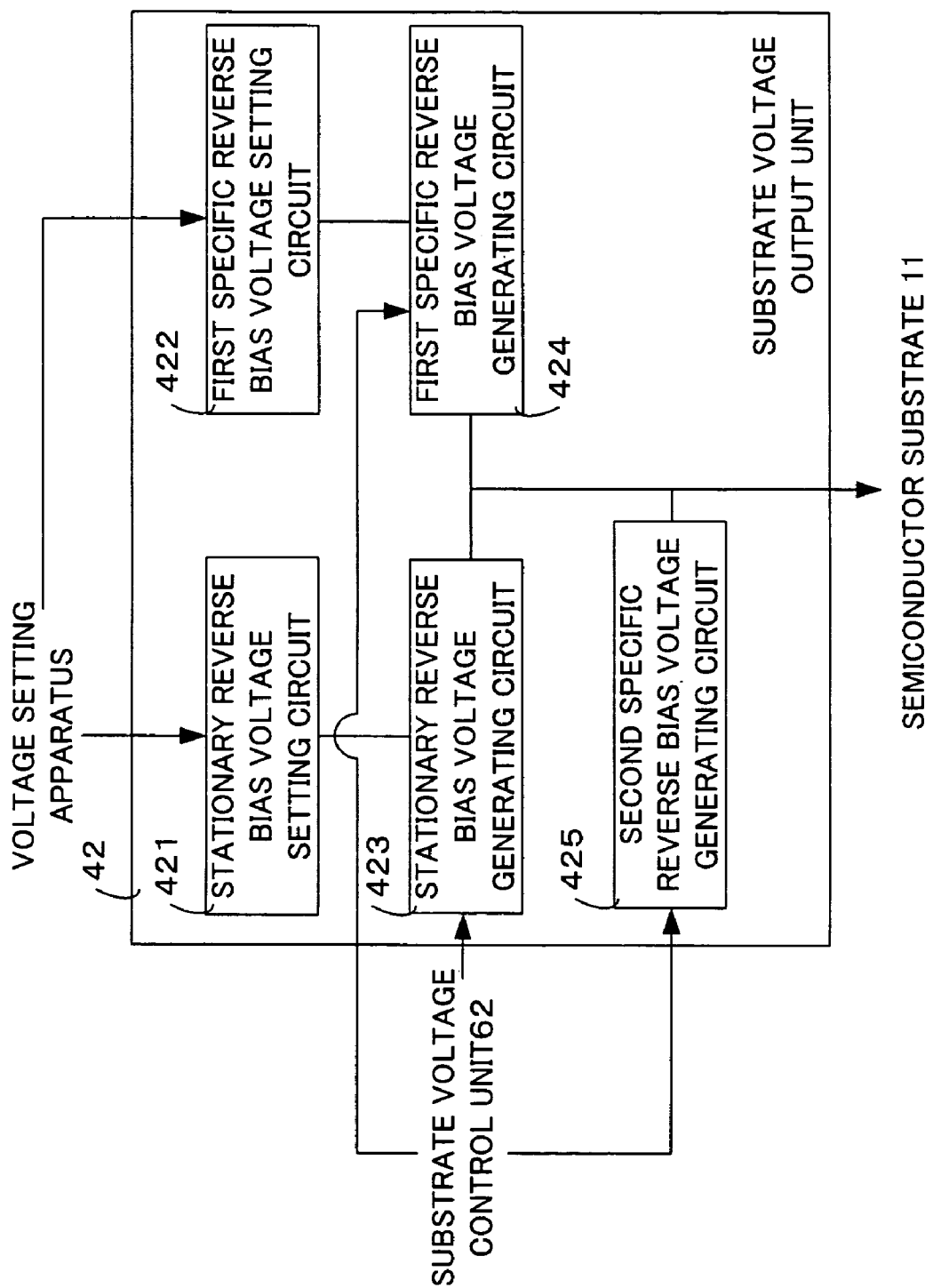
FIG. 13 shows a specific example of the substrate voltage output unit 42.

FIG. 13 shows a specific example of the substrate voltage output unit 42.

As shown in FIG. 13, the substrate voltage output unit 42 includes a stationary reverse bias voltage setting circuit 421, a first specific reverse bias voltage setting circuit 422, a stationary reverse bias voltage generating circuit 423, a first specific reverse bias voltage generating circuit 424, and a second specific reverse bias voltage generating circuit 425.

The stationary reverse bias voltage setting circuit 421 sets the stationary reverse bias voltage, which is output from the stationary reverse bias voltage generating circuit 423, using the same method as the read voltage setting circuit 411.

The first specific reverse bias voltage setting circuit 422 sets the first specific reverse bias voltage, which is output from the first specific reverse bias voltage generating circuit 424, using the same method as the read voltage setting circuit 411.

The stationary reverse bias voltage generating circuit 423 is a variable booster circuit, and raises a voltage input from a power source to a level of the stationary reverse bias voltage, based on the circuit constant of the stationary reverse bias voltage setting circuit 421, and outputs the stationary reverse bias voltage.

The first specific reverse bias voltage generating circuit 424 is a variable booster circuit, and raises a voltage input from a power source to a level of the first specific reverse bias voltage, based on the circuit constant of the first specific reverse bias voltage setting circuit 422, and outputs the first specific reverse bias voltage.

The second specific reverse bias voltage generating circuit 425 is a fixed booster circuit, and raises a voltage input from a power source to a predetermined level of the second specific reverse bias voltage, and outputs the second specific reverse bias voltage.

Detailed explanations of the fixed and variable booster circuits will not be given since they are known technologies.

Figure 14:
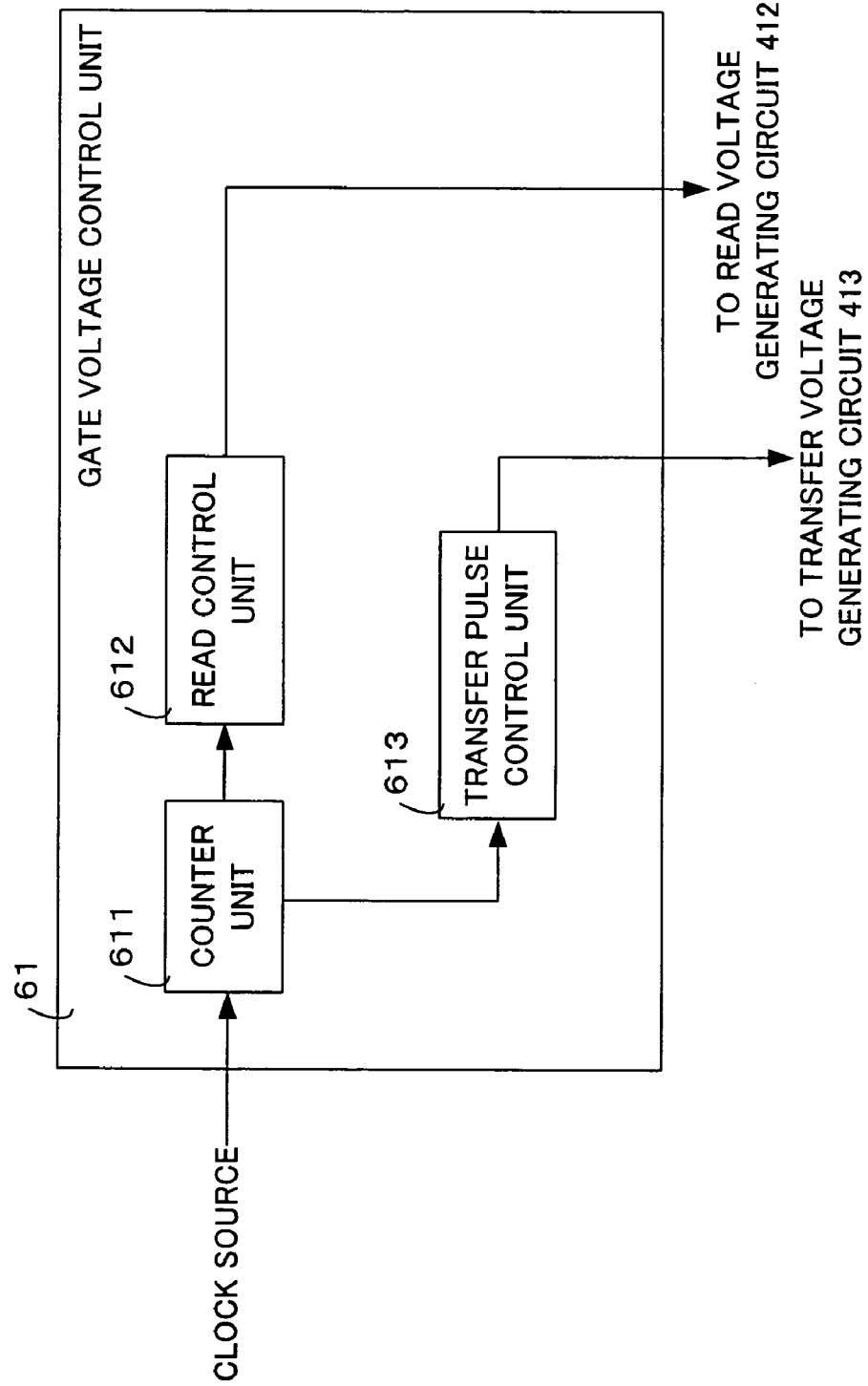
FIG. 14 shows a specific example of the gate voltage control unit 61.

FIG. 14 shows a specific example of the gate voltage control unit 61.

As shown in FIG. 14, the gate voltage control unit 61 includes a counter unit 611, a read control unit 612, and a transfer pulse control unit 613.

The counter unit 611 is, for example, a scale-of-660 counter for obtaining counts of a 50 KHz clock source and outputting 660 counts thereof with each cycle. The counter unit 311 outputs counts "0" and "4" to the read control unit 612, and outputs count "5" to the transfer pulse control unit 613.

The read control unit 612 is, for example, a SR latch, and starts outputting a control signal, which instructs to output the read voltage, to the read voltage generating circuit 412 when it receives count "0", and stops outputting the control signal when it receives count "4".

The transfer pulse control unit 613 is a pulse generating circuit, and outputs a pulse of a control signal, which instructs to output the transfer voltage, to the transfer voltage generating circuit 413 a predetermined number of times, starting to output the pulse when it receives count "5" from the counter unit 611.

Figure 15:
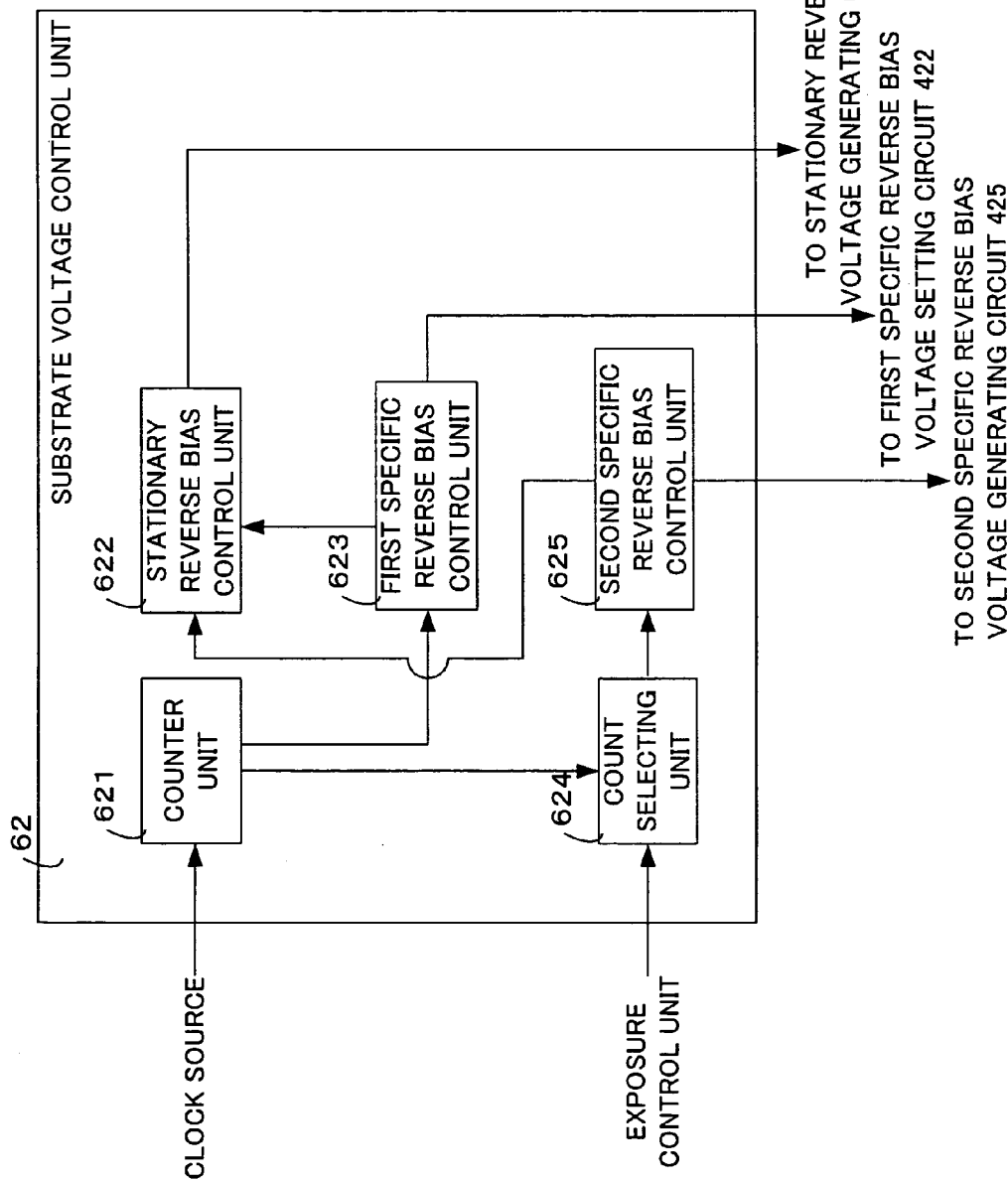
FIG. 15 shows a specific example of the substrate voltage control unit 62.

FIG. 15 shows a specific example of the substrate voltage control unit 62.

As shown in FIG. 15, the substrate voltage control unit 62 includes a counter unit 621, a stationary reverse bias control unit 622, a first specific reverse bias control unit 623, a count selecting unit 624, and a second specific reverse bias control unit 625.

The counter unit 621, as is the case with the counter unit 611, is a scale-of-660 counter for obtaining counts of, for example, a 50 KHz clock source and outputting 660 counts thereof with each cycle. The counter unit 621 synchronizes with the counter unit 611, and outputs counts "0" and "4" to the first specific reverse bias control unit 623, and outputs counts "5"-"650" to the count selecting unit 624.

The stationary reverse bias control unit 622 is, for example, a logic circuit, and steadily outputs a control signal, which instructs to output a stationary reverse bias voltage, to the stationary reverse bias voltage generating circuit 423 except for a period during which it receives a control signal from the first specific reverse bias control unit 623 or the second specific reverse bias control unit 625.

The first specific reverse bias control unit 623 is, for example, a SR latch, and starts outputting a control signal, which instructs to output the first specific reverse bias voltage, to the stationary reverse bias control unit 622 and the first specific reverse bias voltage setting circuit 422 when it receives count "0", and stops outputting the control signal when it receives count "4".

The count selecting unit 624 is, for example, a selector, selects two counts depending on a shutter speed specified by an exposure control unit or the like, and outputs the selected counts to the second specific reverse bias control unit 625. In this example, it is presumed that the shutter speed is set to 1/1,000s, and in correspondence with the setting, counts "646" and "650" are selected.

The second specific reverse bias control unit 625 is, for example, a SR latch, and starts outputting a control signal, which instructs to output the second specific reverse bias voltage, to the stationary reverse bias control unit 622 and the second specific reverse bias voltage generating circuit 425 when it receives the first one of the selected two counts, and stops outputting the control signal when it receives the second one of the selected two counts.

It should be noted here that a specific example of the gate voltage applied to the gate electrode 17 by the gate voltage output unit 41 can be seen in FIG. 3 of Embodiment 1, and that a specific example of the reverse bias voltage applied to the semiconductor substrate 11 by the substrate voltage output unit 42 can also be seen in FIG. 3 of Embodiment 1.

Also, a specific example of the potential distribution in Embodiment 2 can be seen in FIGS. 6-8 of Embodiment 1.

Operation

Figure 16:
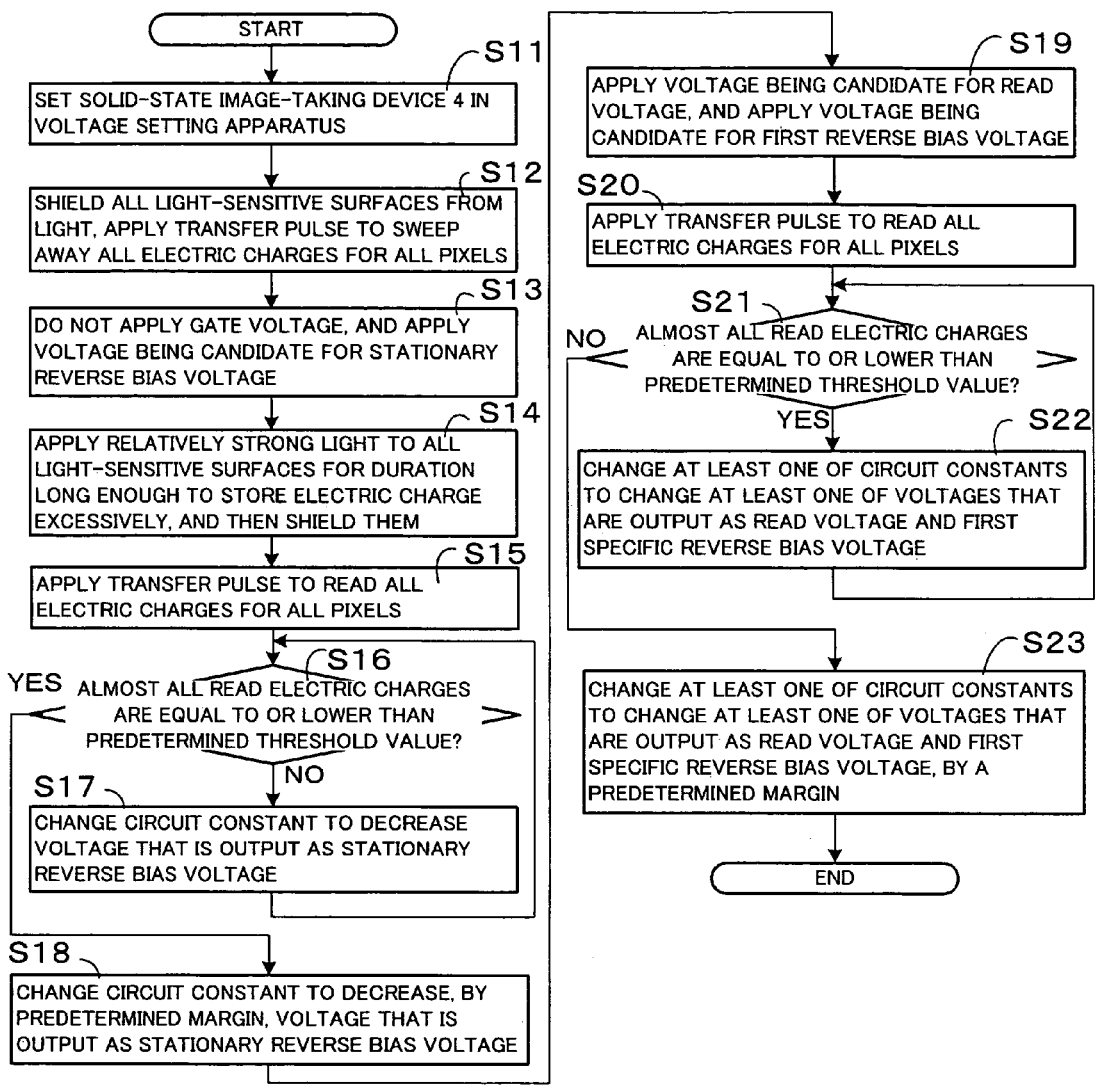
FIG. 16 shows a procedure for the image-taking system in Embodiment 2 to set the stationary reverse bias voltage, read voltage, and first specific reverse bias voltage.
Figure 17:
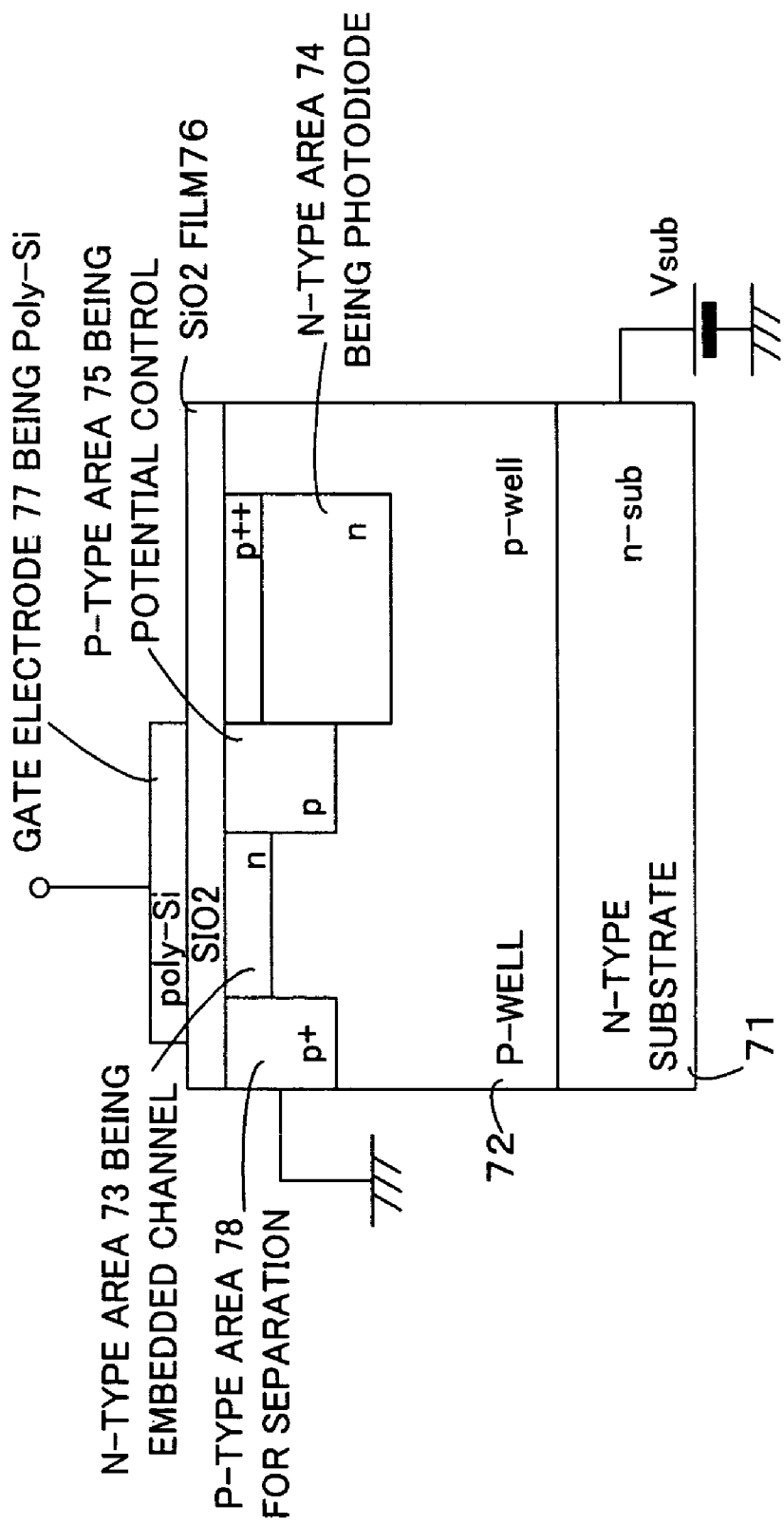
FIG. 17 shows the structure of a portion of a conventional solid-state image-taking device of charge-transfer type, the portion corresponding to one unit pixel.

FIG. 16 shows a procedure for the image-taking system in Embodiment 2 to set the stationary reverse bias voltage, read voltage, and first specific reverse bias voltage.

The following explains the procedure of setting the stationary reverse bias voltage, read voltage, and first specific reverse bias voltage, using FIG. 16.

(1) The solid-state image-taking device 4 is set in a voltage setting apparatus (step S11).

(2) The voltage setting apparatus controls the gate voltage output unit 41 so that all light-sensitive surfaces of the solid-state image-taking device 4 are shielded from light, and the transfer pulse is applied to the gate electrode 17 to sweep away all electric charges for all the pixels from the charge storage unit 13 (step S12).

(3) The voltage setting apparatus controls the gate voltage output unit 41 so that the gate voltage is not applied to the gate electrode 17, and controls the substrate voltage output unit 42 so that a voltage being a candidate for the stationary reverse bias voltage is applied to the semiconductor substrate 11 (step S13).

In this example, it is presumed that in the manufacturing process, a circuit constant, which causes the stationary reverse bias voltage generating circuit 423 to generate a voltage well higher than an expected value of the stationary reverse bias voltage, is set in the stationary reverse bias voltage setting circuit 421, and then in the voltage setting process, the voltage setting apparatus gradually decreases the circuit constant until the vertical overflow drain structure is formed. This determines the value of the stationary reverse bias voltage.

(4) Relatively strong light is applied to all the light-sensitive surfaces of the solid-state image-taking device 4 for a duration that is long enough for the n-type area of the 14 to store electric charge excessively (step S14).

(5) The gate voltage output unit 41 is controlled to apply the transfer pulse to the gate electrode 17 to read all electric charges for all the pixels from the charge storage unit 13 (step S15).

(6) It is judged whether almost all the read electric charges are equal to or lower than a predetermined threshold value, by comparing each read electric charge for one pixel with the predetermined threshold value (step S16).

In the above judgment, the subject of the judgment is "almost all the read electric charges", not "all the read electric charges". This is because the possibility of there being a few defective pixels has been taken into account. If there is no need to take such possibility into account, the subject of the judgment may be "all the read electric charges".

(7) If it is judged in step S16 that not almost all the read electric charges are equal to or lower than the predetermined threshold value, which means that the vertical overflow drain structure has not been formed, the voltage setting apparatus changes the circuit constant set in the stationary reverse bias voltage setting circuit 421 to decrease the voltage that is output as the stationary reverse bias voltage (step S17), and the control returns to step S16 to repeat the steps.

(8) If it is judged in step S16 that almost all the read electric charges are equal to or lower than the predetermined threshold, which means that the vertical overflow drain structure has been formed, the voltage setting apparatus changes the circuit constant set in the stationary reverse bias voltage setting circuit 421 to decrease, by a predetermined margin, the voltage that is output as the stationary reverse bias voltage, and determines the resultant value as the stationary reverse bias voltage (step S18).

It should be noted here that the decrease of the voltage by the predetermined margin in step S18 may become unnecessary depending on the amount of change at one time in step S17 or the predetermined threshold value in step S16.

(9) The voltage setting apparatus controls the gate voltage output unit 41 so that a voltage being a candidate for the read voltage is applied to the gate electrode 17, and at the same time, controls the substrate voltage output unit 42 so that a voltage being a candidate for the first reverse bias voltage is applied to the semiconductor substrate 11 (step S19).

In this example, it is presumed that in the manufacturing process, circuit constants, which cause the read voltage generating circuit 412 and the first specific reverse bias voltage generating circuit 424 to generate voltages that are respectively well lower than expected values of the read voltage and the first reverse bias voltage, are set in the read voltage setting circuit 411 and the first specific reverse bias voltage setting circuit 422, and then in the voltage setting process, the voltage setting apparatus gradually decreases these circuit constants until there is no remnant signal charge. This determines the values of the read voltage and the first reverse bias voltage.

(10) The gate voltage output unit 41 is controlled to apply the transfer pulse to the gate electrode 17 to read all electric charges for all the pixels from the charge storage unit 13 (step S20).

(11) It is judged whether almost all the read electric charges are equal to or lower than a predetermined threshold value, by comparing each read electric charge for one pixel with the predetermined threshold value (step S21).

In the above judgment, the subject of the judgment is "almost all the read electric charges", not "all the read electric charges". This is because the possibility of there being a few defective pixels has been taken into account. If there is no need to take such possibility into account, the subject of the judgment may be "all the read electric charges".

Also, the predetermined threshold values used in steps S21 and S16 are not related to each other, and are determined independently.

(12) If it is judged in step S21 that almost all the read electric charges are equal to or lower than the predetermined threshold value, which means that signal charge remained except for the first round, the voltage setting apparatus changes at least one of the circuit constants set in the read voltage setting circuit 411 and the first specific reverse bias voltage setting circuit 422 to change at least one of the voltages that are output as the read voltage and the first specific reverse bias voltage (step S22), and the control returns to step S21 to repeat the steps.

It should be noted here that in the first round, the signal charge itself is read, and the positive judgment result in step S21 does not mean that signal charge remained. Nonetheless, the same operation is performed in step S22.

(13) If it is judged in step S21 that not almost all the read electric charges are equal to or lower than the predetermined threshold, which means that signal charge did not remain, the voltage setting apparatus changes at least one of the circuit constants set in the read voltage setting circuit 411 and the first specific reverse bias voltage setting circuit 422 to change at least one of the voltages, by a predetermined margin, and determines the resultant value as the read voltage or the first specific reverse bias voltage (step S23).

It should be noted here that the change of the voltages by the predetermined margins in step S23 may become unnecessary depending on the amount of change at one time in step S22 or the predetermined threshold value in step S21.

Summary

According to Embodiment 2 having been described up to now, the reverse bias voltage is changed while the read voltage is applied, to decrease the potential depth of the photodiode. This makes it possible to prevent signal charge from remaining even if the read voltage is set to a low level. This also makes it difficult for the signal charge to remain, while maintaining the saturation amount of electric charge, even if the surface area of the unit pixel is decreased. Furthermore, it is possible to set the read voltage, stationary reverse bias voltage, and first specific reverse bias voltage, independently in every device to absorb the individual difference in characteristic.

In Embodiment 2, the driving unit only notifies the solid-state image-taking device of the timing with which each voltage is applied, and voltage generating circuits for actually generating each voltage are provided in the solid-state image-taking device. However, one of the voltages to be applied to the gate or the substrate may be generated by a variable booster circuit provided in the driving unit, without the voltage generating circuit specifically provided for this in the solid-state image-taking device.

The above-described embodiments of the present invention achieve a low, read voltage by controlling an n-type substrate voltage in a solid-state image-taking apparatus having the vertical overflow drain structure, with a p-well formed on an n-type semiconductor substrate, and an n-type photodiode formed in the p-well. It is apparent however that the same advantageous effect can also be achieved by a MOS-type image sensor that has the same construction as the solid-state image-taking apparatus if the n-type area as the embedded channel is replaced with a drain or a floating diffusion unit. For example, such a low, read voltage can also be achieved by controlling a p-type substrate voltage in a solid-state image-taking apparatus that does not have the vertical overflow drain structure, such as a MOS-type image sensor in which an n-type photodiode is formed in a p-type substrate.

INDUSTRIAL APPLICABILITY

The present invention can be applied to image-taking apparatuses such as home video cameras and digital still cameras. The present invention provides a solid-state image-taking device that makes it difficult for the signal charge to remain even if the surface area of the unit pixel is decreased, contributing to improvement of image quality in the image-taking apparatuses and cost down.

Not limited to home-use one, the present invention can be applied to every type of image-taking apparatus.

What is claimed is:

1. A solid-state image-taking system comprising a solid-state image-taking apparatus for outputting electric charge read from a light-to-electric conversion unit, and a driving apparatus for driving the solid-state image-taking apparatus, the solid-state image-taking apparatus including:
   a semiconductor substrate of a first type which is either an n-type or a p-type;
   a well of a second type formed on the semiconductor substrate, the second type being either the n-type or the p-type and different from the first type;

the light-to-electric conversion unit which, being the first type and formed in the well, is operable to generate and store electric charge that depends, in amount, on an amount of received light;

a charge storage unit which, being the first type and formed in the well, is operable to store electric charge temporarily; and a gate unit which, being the second type and formed between the light-to-electric conversion unit and the charge storage unit in the well, is operable to move the electric charge from the light-to-electric conversion unit to the charge storage unit when a read voltage is applied to a gate electrode, the driving apparatus including:

a read voltage control unit operable to not apply the read voltage to the gate electrode during a storage period in which the light-to-electric conversion unit generates and stores the electric charge that depends, in amount, on the amount of the received light, then to apply the read voltage to the gate electrode during a read period; and a reverse bias voltage control unit operable to apply a stationary reverse bias voltage steadily to the semiconductor substrate to cause electric charge excessively stored in the light-to-electric conversion unit to overflow to a side of the semiconductor substrate, and not to the charge storage unit, and operable to apply, during part or all of the read period, a specific reverse bias voltage that raises a potential barrier between the semiconductor substrate and the well to be higher than a height thereof when the reverse bias voltage control unit applies the stationary reverse bias voltage.

2. A driving apparatus for driving a solid-state image-taking apparatus that outputs electric charge read from a light-to-electric conversion unit, the solid-state image-taking apparatus including:

a semiconductor substrate of a first type which is either an n-type or a p-type;

a well of a second type formed on the semiconductor substrate, the second type being either the n-type or the p-type and different from the first type;

the light-to-electric conversion unit which, being the first type and formed in the well, is operable to generate and store electric charge that depends, in amount, on an amount of received light;

a charge storage unit which, being the first type and formed in the well, is operable to store electric charge temporarily; and a gate unit which, being the second type and formed between the light-to-electric conversion unit and the charge storage unit in the well, is operable to move the electric charge from the light-to-electric conversion unit to the charge storage unit when a read voltage is applied to a gate electrode, the driving apparatus comprising:

a read voltage control unit operable to not apply the read voltage to the gate electrode during a storage period in which the light-to-electric conversion unit generates and stores the electric charge that depends, in amount, on the amount of the received light, then to apply the read voltage to the gate electrode during a read period; and a reverse bias voltage control unit operable to apply a stationary reverse bias voltage steadily to the semiconductor substrate to cause electric charge excessively stored in the light-to-electric conversion unit to overflow to a side of the semiconductor substrate, and not to the charge storage unit, and operable to apply, during part or all of the read period, a specific reverse bias voltage that raises a potential barrier between the semiconductor substrate and the well to be higher than a height thereof when the reverse bias voltage control unit applies the stationary reverse bias voltage.

3. The driving apparatus of claim 2 further comprising an output unit operable to output the electric charge, either directly or via transfer, from the charge storage unit to outside, wherein during a period immediately after the read voltage control unit completes applying the read voltage until the output unit completes outputting the electric charge, the reverse bias voltage control unit does not apply the specific reverse bias voltage that raises the potential barrier between the semiconductor substrate and the well to be higher than the height thereof when the reverse bias voltage control unit applies the stationary reverse bias voltage.

4. A driving method for driving a solid-state image-taking apparatus that outputs electric charge read from a light-to-electric conversion unit, the solid-state image-taking apparatus including:

a semiconductor substrate of a first type which is either an n-type or a p-type;

a well of a second type formed on the semiconductor substrate, the second type being either the n-type or the p-type and different from the first type;

the light-to-electric conversion unit which, being the first type and formed in the well, is operable to generate and store electric charge that depends, in amount, on an amount of received light;

a charge storage unit which, being the first type and formed in the well, is operable to store electric charge temporarily; and a gate unit which, being the second type and formed between the light-to-electric conversion unit and the charge storage unit in the well, is operable to move the electric charge from the light-to-electric conversion unit to the charge storage unit when a read voltage is applied to a gate electrode, the driving method comprising the steps of:

controlling storage by not applying the read voltage to the gate electrode and applying a stationary reverse bias voltage steadily to the semiconductor substrate to cause electric charge excessively stored in the light-to-electric conversion unit to overflow to a side of the semiconductor substrate, and not to the charge storage unit, while causing the light-to-electric conversion unit to generate and store electric charge that depends, in amount, on an amount of received light; and causing the electric charge to be read from the light-to-electric conversion unit to the charge storage unit by applying the read voltage to the gate electrode when, in the storage control step, the light-to-electric conversion unit has generated and stored the electric charge for a predetermined duration of time, and by applying, during part or all of a period in which the read voltage is applied, a specific reverse bias voltage that raises a potential barrier between the semiconductor substrate and the well to be higher than a height thereof when the stationary reverse bias voltage is applied.

* * * * *